US012638419B2

(12) United States Patent
Ahmed et al.

(10) Patent No.: US 12,638,419 B2
(45) Date of Patent: May 26, 2026

(54) REMOTE FIELD EDDY CURRENT BASED SYSTEM AND METHOD FOR CORROSION INSPECTION

(71) Applicants: KING ABDULLAH UNIVERSITY OF SCIENCE AND TECHNOLOGY, Thuwal (SA); SAUDI ARABIAN OIL COMPANY, Dhahran (SA)

(72) Inventors: Shehab Ahmed, Thuwal (SA); Hakan Bagci, Thuwal (SA); Moutazbellah A. Khater, Thuwal (SA); Mohamed Larbi Zeghlache, Dhahran (SA); Tarek Mahmoud Atia Mostafa, Thuwal (SA); Guang An Ooi, Thuwal (SA); Mehmet Burak Ozakin, Thuwal (SA)

(73) Assignees: KING ABDULLAH UNIVERSITY OF SCIENCE AND TECHNOLOGY, Thuwal (SA); SAUDI ARABIAN OIL COMPANY, Dhahran (SA)

( * ) Notice: Subject to any disclaimer, the term of this patent is extended or adjusted under 35 U.S.C. 154(b) by 175 days.

(21) Appl. No.: 18/376,142

(22) Filed: Oct. 3, 2023

(65) Prior Publication Data

US 2024/0118241 A1     Apr. 11, 2024

Related U.S. Application Data

(60) Provisional application No. 63/412,652, filed on Oct. 3, 2022.

(51) Int. Cl.
*G01N 27/90*          (2021.01)
(52) U.S. Cl.
CPC ................................ *G01N 27/9006* (2013.01)

(58) Field of Classification Search
None
See application file for complete search history.

(56) References Cited

U.S. PATENT DOCUMENTS

| | | | | |
|---|---|---|---|---|
| 4,814,702 | A | * | 3/1989 | Driggers .................. G01B 7/14 |
| | | | | 324/207.16 |
| 5,537,035 | A | * | 7/1996 | Fowler ................... G01N 27/82 |
| | | | | 324/242 |

(Continued)

OTHER PUBLICATIONS

Brill, T.M., "Electromagnetic Casing Inspection Tool for Corrosion Evaluation," in International Petroleum Technology Conference held in Bangkok, Thailand, Feb. 7-9, 2012, IPTC-14865-MS, pp. 1-14.

(Continued)

*Primary Examiner* — Richard Isla
(74) *Attorney, Agent, or Firm* — PATENT PORTFOLIO BUILDERS PLLC

(57)          ABSTRACT

A remote field eddy current, RFEC, system for detecting an azimuth location of a defect in a pipe includes a holder extending along a longitudinal axis X and shaped to flow through the pipe, a magnetic field generator located within the holder and configured to generate a first magnetic field $B_0$, a 3-axis fluxgate magnetometer located within the holder, at a given distance away from the transmitter, along the longitudinal axis X, wherein the fluxgate magnetometer is configured to measure a second magnetic field B, which is a result of the first magnetic field $B_0$ interacting with the defect in the pipe, and a controller located within the holder and configured to receive a value of the second magnetic field B and to determine an azimuth of the defect in the pipe by interpreting radial components of the measured field, and an extent of the defect based on the second magnetic field B.

20 Claims, 25 Drawing Sheets

(56)　　　References Cited

U.S. PATENT DOCUMENTS

| 6,127,823 | A | * | 10/2000 | Atherton | G01N 27/902 |
| | | | | | 324/240 |
| 7,526,971 | B2 | * | 5/2009 | Mandziuk | F16L 55/38 |
| | | | | | 73/866.5 |
| 9,651,472 | B2 | * | 5/2017 | Davis | G01N 17/00 |
| 9,746,583 | B2 | * | 8/2017 | Berkcan | G01V 5/145 |
| 10,338,030 | B2 | * | 7/2019 | Bittar | E21B 47/006 |
| 10,539,535 | B2 | * | 1/2020 | Tada | G01N 27/82 |
| 11,029,283 | B2 | * | 6/2021 | Zheng | G01N 27/83 |
| 11,480,706 | B2 | * | 10/2022 | Fanini | G01V 3/28 |
| 2004/0189289 | A1 | * | 9/2004 | Atherton | G01N 33/383 |
| | | | | | 324/240 |
| 2017/0241953 | A1 | * | 8/2017 | Kagawa | G01N 27/82 |
| 2018/0038833 | A1 | * | 2/2018 | Iannucci | G01N 27/83 |
| 2019/0178844 | A1 | * | 6/2019 | Lott | G01R 33/028 |
| 2020/0003929 | A1 | * | 1/2020 | Wilson | G01V 3/28 |

OTHER PUBLICATIONS

Dutta, S., et al., "Analysis and Interpretation of Multi-Barrier Transient Electromagnetic Measurements," SPWLA 61st Annual Logging Symposium, Jun. 24 to Jul. 29, 2020, DOI: 10.30632/SPWLA-5008, pp. 1-13.

Dutta, S.M., et al., "Quantitative Evaluation of Multi-Annular Downhole Corrosion Using Time-Domain Electromagnetic Measurements," in Abu Dhabi International Petroleum Exhibition & Conference, Nov. 15-18, 2021, SPE-207260-MS, pp. 1-12.

Fouda, A., et al., "Multi-Tubular Electromagnetic Corrosion Inspection Tool—Performance Demonstration using Yard Testing," in Abu Dhabi International Petroleum Exhibition & Conference, held virtually Nov. 9-12, 2020, SPE-202718-MS, pp. 1-23.

Gooneratne, C.P., et al., "Downhole Applications of Magnetic Sensors," Sensors, Oct. 19, 2017, vol. 17, No. 10, 384, pp. 1-32.

Haugland, S.M., et al., "Fundamental Analysis of the Remote-Field Eddy-Current Effect," IEEE Transactions on Magnetics, Jul. 4, 1996, vol. 32, No. 4, pp. 3195-3211.

Ooi, G.A., et al., "EM-Based 2D Corrosion Azimuthal Imaging using Physics Informed Machine Learning PIML," In SPE Offshore Europe Conference & Exhibition held virtually on Sep. 7-10, 2021, SPE-205404-MS, pp. 1-15.

Park, J.W., et al., "Enhanced Detection of Defects Using GMR Sensor Based Remote Field Eddy Current Technique," Journal of Magnetics, Dec. 2017, vol. 22, No. 4, pp. 531-538.

Pasadas, D.J., et al., "Remote Field Eddy Current Inspection of Metallic Tubes Using GMR Sensors," 2013 IEEE International Instrumentation and Measurement Technology Conference (12MTC), May 6-9, 2013, pp. 296-299, IEEE.

Pasadas, D.J.L., et al., "Defect Detection in Stainless Steel Tubes with AMR and GMR Sensors Using Remote Field Eddy Current Inspection," ACTA IMEKO, Jun. 2015, vol. 4, No. 2, pp. 62-67.

Ramos, H.G., et al., "Present and Future Impact of Magnetic Sensors in NDE," Procedia Engineering, 2014, vol. 86, pp. 406-419, Elsevier Ltd.

Rifai, D., et al., "Giant Magnetoresistance Sensors: A review on Structures and Non-Destructive Eddy Current Testing Applications," Sensors, Feb. 26, 2016, vol. 16, No. 298, 3. doi.org/10.3390/S16030298, pp. 1-30.

San Martin, L.E., et al., "New High-Definition Frequency Tool for Tubing and Multiple Casing Corrosion Detection," in Abu Dhabi International Petroleum Exhibition & Conference, held Nov. 13-16, 2017, SPE-188932-MS, pp. 1-14.

Zeghlache, M.L., et al., "Comprehensive Casing Corrosion Inspection Using Multi-Frequency Array EM Technology," in SPE International Oilfield Corrosion Conference and Exhibition, held virtually Jun. 16-17, 2021. SPE-205050-MS, pp. 1-15.

Zhang, J., et al., "New Ruggedized Electromagnetic Tool Achieving Quantitative Azimuthal Casing Inspection," in SPWLA 59th Annual Logging Symposium, Jun. 2-6, 2018, pp. 1-21.

* cited by examiner

| Sensor | Dimensions (mm) | Number of turns (0.1mm wire) | Sensitivity at 1Hz (mV/uT) | Sensitivity at 5Hz (mV/uT) | Sensitivity at 10Hz (mV/uT) |
|---|---|---|---|---|---|
| Air-core coil | 25 x 200 | 220,000 | 0.26 | 1.3 | 2.6 |
| Ferromagnetic-core coil | 25 x 200 | 164,000 | 8 | 40 | 80 |
| 3-axis Fluxgate Magnetometer 03MC70 Bartington Inst. | 25 x 200 | NA | 143 | 143 | 143 |

FIG. 2

| Defect | Setup | Type | Dimensions (cm) | Cross-sectional metal loss % |
|---|---|---|---|---|
| 1 | Single pipe | 50% wall thinning (Partial loss) | 3 × 3 | 4.77% |
| 2 | Single pipe | 100% loss (Full loss) | 3 × 3 | 9.6% |
| 3 | Double pipe | 100% (Full loss) on 2$^{nd}$ Pipe only | 3 × 3 | 3.1% |

FIG. 8

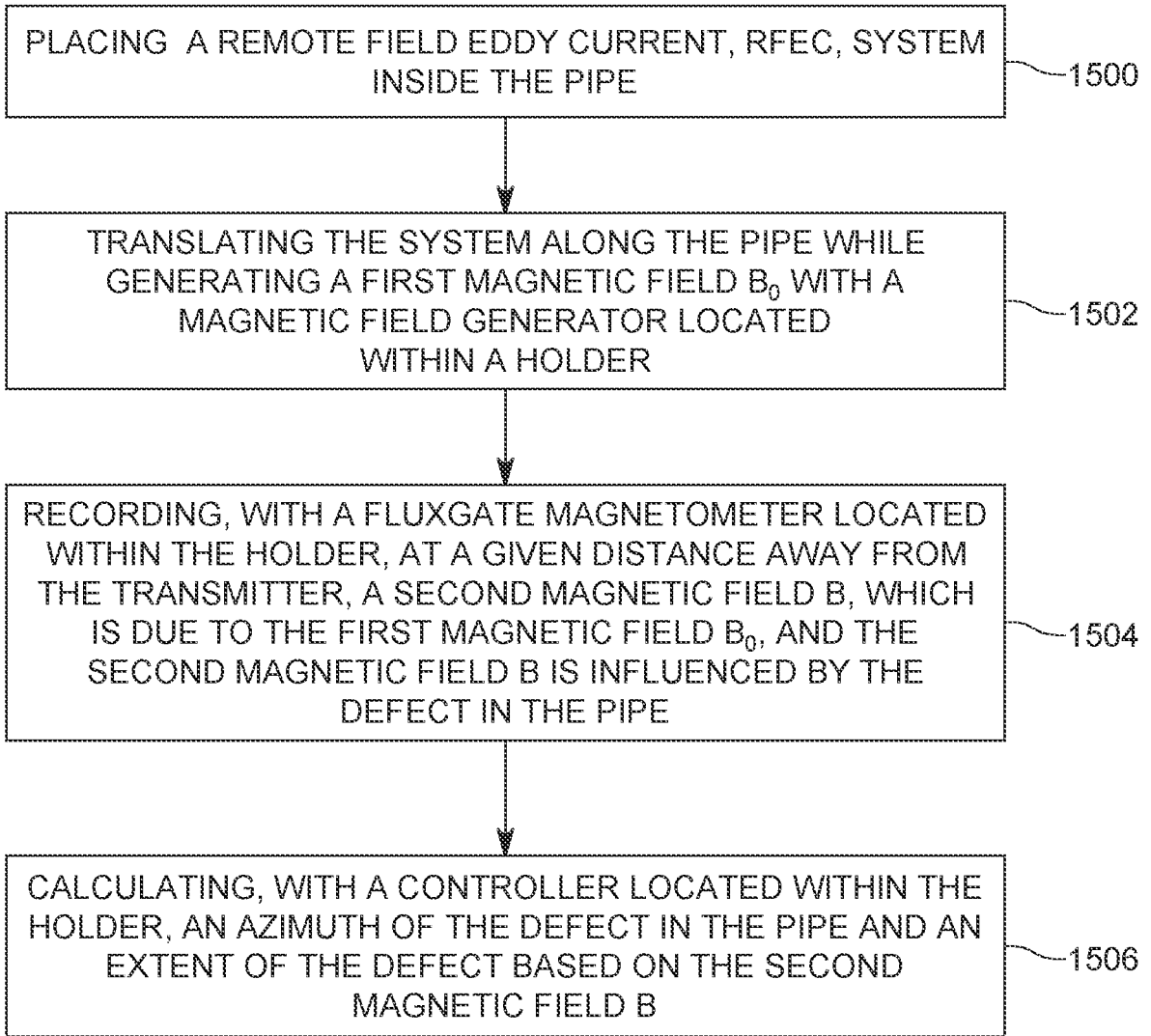

PLACING A REMOTE FIELD EDDY CURRENT, RFEC, SYSTEM INSIDE THE PIPE — 1500

TRANSLATING THE SYSTEM ALONG THE PIPE WHILE GENERATING A FIRST MAGNETIC FIELD $B_0$ WITH A MAGNETIC FIELD GENERATOR LOCATED WITHIN A HOLDER — 1502

RECORDING, WITH A FLUXGATE MAGNETOMETER LOCATED WITHIN THE HOLDER, AT A GIVEN DISTANCE AWAY FROM THE TRANSMITTER, A SECOND MAGNETIC FIELD B, WHICH IS DUE TO THE FIRST MAGNETIC FIELD $B_0$, AND THE SECOND MAGNETIC FIELD B IS INFLUENCED BY THE DEFECT IN THE PIPE — 1504

CALCULATING, WITH A CONTROLLER LOCATED WITHIN THE HOLDER, AN AZIMUTH OF THE DEFECT IN THE PIPE AND AN EXTENT OF THE DEFECT BASED ON THE SECOND MAGNETIC FIELD B — 1506

REMOTE FIELD EDDY CURRENT BASED SYSTEM AND METHOD FOR CORROSION INSPECTION

CROSS-REFERENCE TO RELATED APPLICATIONS

This application claims priority to U.S. Provisional Patent Application No. 63/412,652, filed on Oct. 3, 2022, entitled "REMOTE FIELD EDDY CURRENT SYSTEM USING THREE AXIS FLUXGATE MAGNETOMETER FOR CORROSION INSPECTION," the disclosure of which is incorporated herein by reference in its entirety.

BACKGROUND OF THE INVENTION

Technical Field

Embodiments of the subject matter disclosed herein generally relate to a system and method for remotely determining the corrosion in one or more pipes or similar system, and more particularly, to a system that uses a three-axis fluxgate magnetometer for increasing the sensitivity to a generated magnetic field and to enable extraction of azimuth location and extent of a defect from radial measurements.

Discussion of the Background

The oil and gas industry uses one or more metal based casings (pipes) for extracting resources from the wells or from moving these resources through a chemical plant. However, these pipes may be exposed to highly corrosive chemicals and thus, become corroded. If the pipe becomes corroded, there is a risk that oil or gas or other derivates may be lost in the subsurface or in the chemical plant, which reduces the extraction/processing efficiency and also might pollute the soil. For these reasons, routine pipe/casing inspections are critical in the oil and gas industry to ensure a safer, more efficient, and environmentally friendly operation. Several electromagnetic (EM) methods have been used to evaluate corrosion in wellbore casings or chemical plant pipes. The most commonly used EM methods to evaluate multi-casings wells are time- and frequency-domain methods.

The Time domain method [1], also known as the "Pulsed Eddy Current" method (PEC), generates pulsating EM fields within the well, using transmitter coils. At fixed time intervals, the transmitters are switched off and the decaying EM fields, resulting from the eddy currents induced in the pipes, are measured and recorded. The characteristics of the inspected casings are deduced from the associated decay curve, by using inversion algorithms. In theory, this method can assess the individual thickness of each casing by considering a specific time interval in the full time-decay response. Changes in the early and late time responses are attributed to a loss in the inner and outer casings, respectively. PEC techniques provide several benefits: straightforward tool design, ability to evaluate several casings with a single pulse excitation, and lower power usage. On the other hand, the main drawbacks are the high-level of complexity in post-processing time responses to extract thickness information, relatively poor logging speed due to separate stimulation and reception stages, and low signal-to-noise ratio (SNR) for outer barriers. However, recent developments in this field have made great progress with novel coil design and acquisition schemes.

Frequency domain methods [2], also called the "continuous wave" methods, rely on the remote field eddy current (RFEC) concept. RFEC-based tools employ a transmitter coil and a receiver coil (or an array of receiver coils). The transmitter coil is driven by a continuous low-frequency source, typically in the range of 1-100 Hz. The receiver coil and the transmitter coil are separated by an axial distance equal to at least 1.5 times the diameter of the inner pipe or casing inspected with this device. At this separation (remote field region), two coupling paths exist between the transmitter and the receiver [2]: a direct coupling path through the fluid present inside the pipe, where the amplitude of the field is significantly attenuated by the fluid and becomes negligible at a distance of approximately equal to two times the diameter of the pipe, and an indirect coupling path, where the magnetic field defuses into the pipe wall, propagates on its outer surface, and then re-enters the pipe. This is the point where the receivers are located and defines the remote field region. In this region, the indirect field is dominant. The measured field's magnitude and phase are proportional to the conductivity, permeability, and thickness of the metal casing in which the coils are placed. Any flaws or defects on/in the casing/pipe alter the propagation of the magnetic field, and hence, negatively impact the measured magnitude and phase. Accurate thickness estimation requires the conductivity and permeability profiles of the casing to be known. In addition to pipe thickness, the rate of corrosion can also be estimated by maintaining and analyzing time laps logs.

One of the major limitations of the EM methods briefly described above is that the metal loss information (of the investigated casing or pipe) they provide is averaged over the entire circumference of the casings. Based on experimental data and field experience, a metal loss of about 20% in the circumference of the pipe, in a given cross-section, is the threshold for a well integrity defect to be considered major [3]. The averaged metal loss information provided by the above discussed EM methods can be misleading if this 20% corrosion is distributed over the whole casing instead of being concentrated in one or more spots (cross-sections), leading to the false interpretation than the well integrity is jeopardized. To illustrate this case, FIGS. 1A to 1C show how current EM technologies can produce the same level of averaged metal loss for three different scenarios: a first scenario (shown in FIG. 1A) in which the metal loss 100 is distributed over about half of the circumference of the external casing 110, without fully compromising the structure of the casing, and no damage to the internal tube 112, a second scenario (shown in FIG. 1B) in which the entire metal loss 102 is concentrated in less than a quarter of the circumference of the external casing 110, compromising the integrity of the casing, and a third scenario (shown in FIG. 1C) in which a first small portion of the circumference of the external casing 110 is partially compromised and another second small portion of the circumference of the external casing is fully compromised, so that the metal loss 104 is still about 20% of the casing, but distributed in two different sectors. In all three situations, the existing methods determine a 20% metal loss, without being able to differentiate between the various metal loss distributions 100, 102, and 104.

The different scenarios shown in FIGS. 1A to 1C correspond to the same measurements, which demonstrate the need for multiple-casing corrosion imaging techniques that can differentiate between different types of metal loss and their pipe location (called herein "azimuth location"). Location, shape, and depth of defects can be critical in well integrity evaluation. In fact, the tubing corrosion imaging is the missing piece of the puzzle to complement cement evaluation and leak detection solutions for well explorations.

Thus, there is a need for a new imaging system that is capable of not only determining the presence of corrosion in nested well casing or chemical plant pipe, but also for determining the location, shape and depth of the corrosion defects in that casing or pipe.

SUMMARY OF THE INVENTION

According to an embodiment, there is a remote field eddy current, RFEC, system for detecting an azimuth location of a defect in a pipe, and the system includes a holder extending along a longitudinal axis X and shaped to flow through the pipe, a magnetic field generator located within the holder and configured to generate a first magnetic field $B_0$, a 3-axis fluxgate magnetometer located within the holder, at a given distance away from the transmitter, along the longitudinal axis X, wherein the fluxgate magnetometer is configured to measure a second magnetic field B, which is a result of the first magnetic field $B_0$ interacting with the defect in the pipe, and a controller located within the holder and configured to receive a value of the second magnetic field B and to determine an azimuth of the defect in the pipe by interpreting radial components of the measured field, and an extent of the defect based on the second magnetic field B.

According to another embodiment, there is a method for detecting an azimuth location of a defect in a pipe and the method includes placing a remote field eddy current, RFEC, system inside the pipe, translating the system along the pipe while generating a first magnetic field $B_0$ with a magnetic field generator located within a holder, recording, with a 3-axis fluxgate magnetometer located within the holder, at a given distance away from the transmitter, a second magnetic field B, which is a result of an interaction of the first magnetic field $B_0$ with the defect in the pipe, and calculating, with a controller located within the holder, an azimuth of the defect in the pipe and an extent of the defect based on a value of the measured radial components of the second magnetic field B.

BRIEF DESCRIPTION OF THE DRAWINGS

For a more complete understanding of the present invention, reference is now made to the following descriptions taken in conjunction with the accompanying drawings, in which:

FIG. 2 is a table that illustrates the sensitivity of a fluxgate magnetometer when compared to similar size traditional coil-based induction magnetic sensors;

FIG. 8 is a table illustrating various pipe setups and associated defect extent;

FIG. 15 is a flow chart of a method for determining the azimuth location and extent of a defect in one or more concentric pipes.

DETAILED DESCRIPTION OF THE INVENTION

Figure 1A:
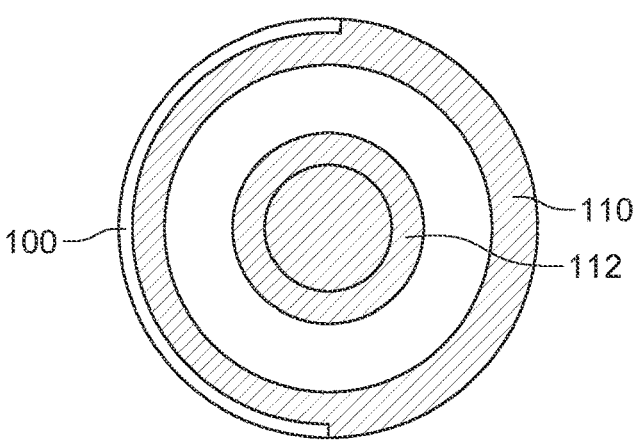
FIGS. 1A to 1C are schematic diagrams of a double casing that is affected by corrosion in different ways.
Figure 1B:
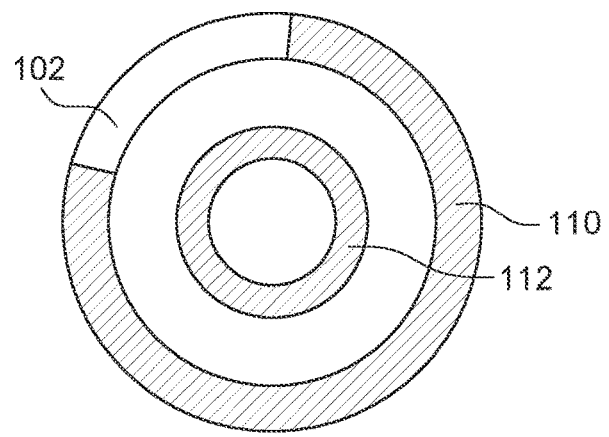
Figure 1C:
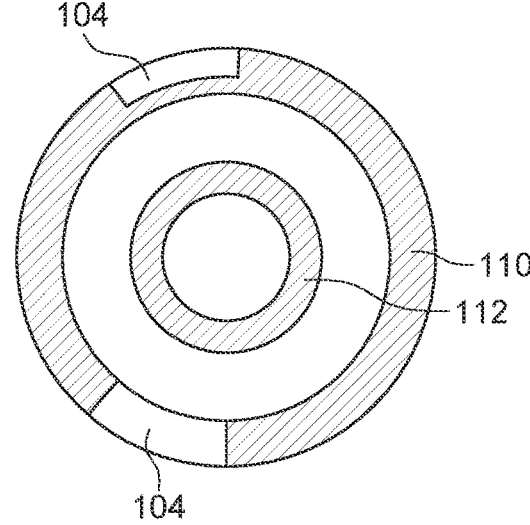

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an RFEC-based system that utilizes high precision, three-axis fluxgate magnetometer to address the challenges of defect localization in a subsurface well casings. However, the embodiments to be discussed next are not limited to oil and gas systems, but may be applied to any casing or tubing located underground or in a processing plant.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel RFEC-based system includes a holder extending along a longitudinal axis X, where the holder is configured to flow through a pipe, or be lowered down into a well casing using a downhole wireline system, a magnetic field generator located within the holder and configured to generate a first magnetic field $B_0$, a fluxgate magnetometer located within the holder, at a given distance away from the transmitter, along the longitudinal axis X, where the fluxgate magnetometer is configured to measure a second magnetic field B, which is due to the first magnetic field $B_0$, and the second magnetic field B is influenced by the defect in the pipe, and a controller located within the holder and configured to receive the second magnetic field B and to determine an azimuth of the defect in the pipe and an extent of the defect based on the second magnetic field B.

Although the RFEC method is widely used in corrosion assessment in multi-casing wells due to its ability to detect inner and outer defects, i.e., defects in a well system that includes plural pipes, distributed inside each other, it still has its own limitations due to the existing systems that implement the method, as now discussed. The RFEC method advantageously does not require direct contact with the pipe's inner surface and does not suffer from the lift-off issue (variations of the perpendicular position of sensing elements). Moreover, the processing of the collected data is relatively more straightforward compared to other methods. However, as discussed above, the signal at the receiver is weakened due to (1) the long distance between the transmitter and receiver coils, and (2) the fact that a low-frequency excitation has to be used. Thus, the detection capability of existing RFEC tools is limited. A typical RFEC tool provides only qualitative average metal thickness for the combined thickness of all casings.

To achieve a more quantitative assessment of the defects, recent research has focused on overcoming the limitations of traditional EM methods. The authors in [4] have introduced a tool that uses a combination of low and high-frequency transmitters and receivers, and a separate independent set of near-field transmitter and receiver to estimate the magnetic properties of the pipe. Using multiple low frequency receivers helps to eliminate the ghosting effect. The tool uses 18 radial receivers (pressed against the wall pipe) to generate high resolution images with azimuthal-sensitivity. The tool can accurately measure the total thickness of multiple casings. However, generation of high-resolution images with azimuthal-sensitivity is restricted to single casing strings only. Furthermore, quantification of small local defects in the tubing has limits. For example, a defect with a 2 cm diameter can only be detected and quantified under very low logging speed with a minimum of 50% of metal loss.

The traditionally RFEC tools use single frequency excitation. However, more recently, to assess individual casing thickness, a RFEC tool that operates multiple-frequency excitations has been introduced [5-7]. This tool uses an array of multi-frequency and multi-spacing transmitters and receivers to provide multiple and optimized depth of investigation. Two transmitters and eight receivers operate continuously at thirteen different frequencies in total, in near, transient, and remote field regions. Short spacing, higher frequency measurements are sensitive to inner pipes while long spacing and lower frequency measurements are sensitive to inner and outer pipes. The individual thicknesses of the plural pipes are retrieved following a procedure that includes material properties estimation, tool calibration and advanced inversion algorithms to decouple individual pipe information. This tool was validated in a 400 ft long yard mockup. This mockup consists of five concentric pipe strings with machined full-band and relatively large defects ranging in length from 2-10 ft with metal loss variation between 8% to 65%. Some of the defects overlap. According to the results presented in [5], all defects are identified for each casing with an average metal loss estimation error of 6%. Larger errors in estimation up to 22% are observed for smaller (2 ft) or overlapping defects. Detection of small local defect less than 2 ft has not been demonstrated for this tool. Additionally, no azimuthal information is provided.

The authors in [8] have proposed an EM tool with quantitative azimuthal location prediction capability. The tool operates with a single frequency for the remote field section and two frequencies for the near field section dedicated to measuring magnetic tubing properties. The tool also integrates near and remote field solutions with four segmented main and differential receivers. This allows measuring the thickness with 90° azimuthal sensitivity. Accurate estimation of defect direction with 90° azimuthal-sensitivity and axial dimensions is demonstrated in a single casing in lab experiments and in the field. In the lab experiments, various types of defects with different orientations are precisely machined in the casing. The smallest defect that is successfully identified is a full circular loss of 2.54 cm (1 in.) diameter. The thinnest detected loss is a 0.254 cm (0.1 in.) thin patch of 6 cm (2.4 in.)×15 cm (6 in.) size. Metal-loss estimation in non-directional defects is nearly perfect. However, a higher percentage of thickness errors were reported for directional defects.

Time-domain EM tools [1, 6, and 9] can provide a better depth of investigation and assess thickness of individual casing layers (since pulsed fields can penetrate further) but have a limited ability in characterizing localized small defects. Hence, a small azimuthal loss cannot be distinguished from even circumferential loss.

It is observed from the above discussion that a detailed and quantitative characterization of azimuthal defects through-tubing remains a serious challenge for the existing EM tools, even though these advanced tools provide valuable total and individual thickness information in well multi-casings or industrial multi-pipes. In addition, some of these tools can provide quantitative characterization of defects with azimuthal location, but this is only demonstrated in the casing closest to the probe, and not for the additional casing/tubing. Furthermore, quantifying localized small defects is still challenging even when they are located on the closest casing.

The novel azimuth corrosion detection tool/system now discussed is capable of overcoming the above noted shortcomings, and to provide an accurate estimate of the corrosion not only in the closest casing/tubing, but also in the additional ones. In addition, this tool is capable of indicating the angle distribution of the corrosion along the circumference of the casing, i.e., to provide accurate azimuthal information with regard to the corrosion in the pipe (also called "defect" herein).

As discussed above, some of the traditional tools are limited by the low operating frequency required for the EM fields to penetrate several casings and the large separation between the transmitter and receiver coils, which result in an extremely weak voltage at the receiver coils. For these reasons, the inspected total thickness of the casings is limited due to the reduced sensitivity. In addition, the noise associated with the traditional measuring devices, as well as the nonuniformity in the magnetic characteristics of the pipe/tubing/casing, reduce the overall SNR and make the thickness estimation even more challenging.

Typical RFEC tools use induction coils as receivers. Traditionally, large axially oriented coil(s) in the center of the tubing are used to predict the average metal thickness and, in more advanced tools, a circumferential array of small coils is deployed inside the tubing to detect the directional location of the defects. In general, the operation of the tool relies on magnetic induction, where the voltage V induced at the coil is proportional to the number of turns (n), the cross-sectional area (A) defined by the turns, and the time derivative of the magnetic flux density $$\frac{dB}{dt},$$

i.e., $$V = -nA \frac{dB}{dt}. \tag{1}$$

It can be seen from equation (1) that the sensitivity of the coil (V/B) can be increased by increasing the number of turns, the active area, or the rate of change (frequency) of the measured flux density in time. Given the requirements of the multibarrier inspection case (i.e., plural casings/tubings/pipes), increasing the frequency is not a good option since the objective here is to maximize the penetration depth. In fact, the system must operate in the range of 1-100 Hz for typical carbon steel casings to improve signal propagation. In addition, it is desired to have a slim profile tool to allow inspection of small-diameter production wells. In this regard, note that some of the piping found in an oil and gas well may have a diameter as small as 6-8 cm. This places a constraint on the diameter of the tool. To achieve a slim-tool design, the number of turns n and the cross-sectional area A of the transmitter and receiver coils are typically restricted to half the diameter of the tubing.

In addition, the requirement for azimuthal-sensitivity for the novel tool adds even more restrictions to the size of the coils. Hence, azimuthal localization is typically restricted only to the first tubing as the required level of coil-sensitivity (V/B) to measure through tubing cannot be achieved with such circumferentially arranged small coils. With the advances in manufacturing technologies, enameled wires with small diameters can be used to increase the number of turns in a given volume. Additionally, the application of a magnetic core can significantly increase the coil sensitivity (V/B), but this comes at the cost of losing the linearity of the response as the permeability of the magnetic core is frequency, flux intensity, and temperature dependent.

At low frequencies, magnetic sensors can offer better (V/B) sensitivity than induction coils. In addition, they consume less power and are smaller in size, offering better spatial resolution. For these reasons, magnetic sensors that rely on Hall effect, giant magnetoresistance (GMR) effect, or anisotropic magneto-resistive (AMR) sensors are widely used in many nondestructive testing (NDT) applications [10-11]. These types of magnetic sensors offer a wide measuring range and can be operated at a large band of frequencies, which makes them good alternatives to induction coils in several NDT applications. In fact, RFEC systems that rely on GMR and AMR sensors have been proposed in the literature by several researchers [12-14].

More accurate and sensitive magnetic sensors such as superconducting quantum interference device (SQUID), fluxgate or scalar magnetometers are rarely used in NDT testing applications as they are bulky, expensive and offer limited bandwidth and measuring range. However, for RFEC systems, the requirement for large bandwidth and measuring range are relaxed due to the low-frequency operation and the spacing between transmitter and receiver coils. Accordingly, the inventors are proposing the use of a triaxial fluxgate magnetometer as an alternative receiver for RFEC systems. Fluxgate magnetometers nowadays are available in ruggedized and small sizes and can operate in the harsh downhole environment [15], where there are high pressure and temperature conditions. Moreover, fluxgate magnetometers offer excellent noise characteristics, low-temperature dependency and high linearity. Unlike the traditional induction coils, the sensitivity of the fluxgate magnetometers is independent of the frequency and is high enough to measure the weak field in the remote region. In addition, the directional-sensitivity of the triaxial magnetometer can be utilized to azimuthally quantify small local defects, not only in the immediate tubing, but also in the outer casings or tubing as discussed later.

A comparison between a traditional tool having coils and the novel tool using the 3-axis fluxgate magnetometer is illustrated in the table in FIG. 2. The table shows a possible enhancement achieved by employing a fluxgate magnetometer in a low-frequency RFEC system. The table lists the sensitivities of typical induction coils and an off-shelf three-axis fluxgate magnetometer. The sensitivities of the coils are calculated based on optimized designs for air-core and ferromagnetic cores. For a conservative comparison, a winding wire of 0.1 mm diameter is chosen. Similar cylindrical dimensions are assumed. The higher sensitivity offered by the fluxgate is evident, as at 1 Hz, its sensitivity is 550 times higher than the coils. It should also be noted that the magnetometer offers this high sensitivity in all X, Y and Z directions. For induction coils, three perpendicular coils of the same size will be needed to offer three-dimensional measurements.

The inventors have discovered that many of the above noted problems may be solved by using a fluxgate magnetometer. A fluxgate magnetometer is a vector magnetometer capable of measuring variations in a magnetic field in the sub nT range, and thus, it is commonly used to measure the magnitude and direction of the earth's magnetic field. Fluxgate magnetometers are available in compact forms with measurement capability along three axes. Hence, they are widely used in compass and navigation applications, space and aviation, geophysical exploration, directional drilling, and metal detection [16].

Figure 3:
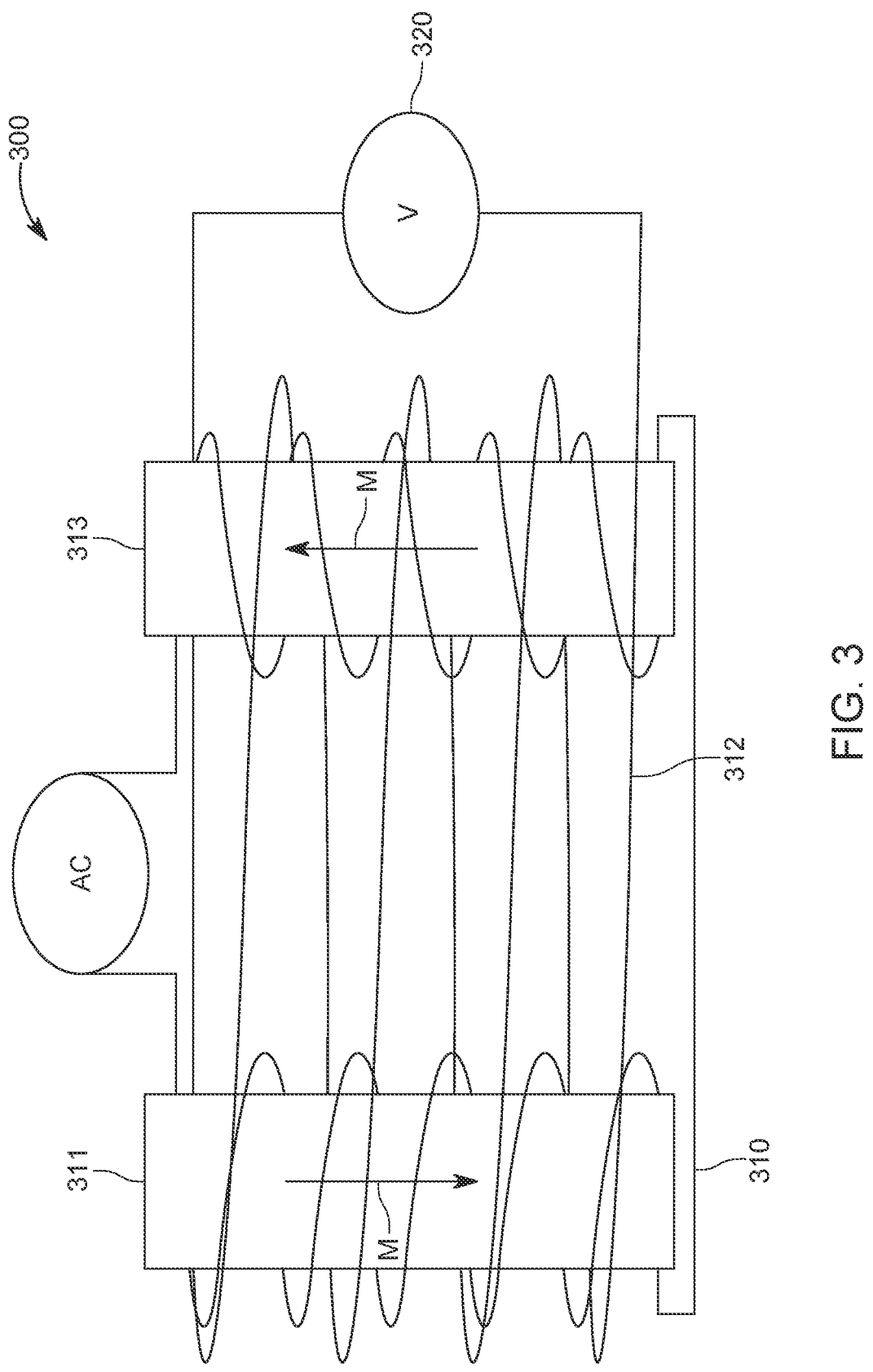
FIG. 3 is a schematic diagram of a fluxgate magnetometer.

A fluxgate magnetometer 300 includes, as shown in FIG. 3, two coils 310 and 312 and identical, high permeability, soft iron cores 311 and 313, placed inside the coil 310. The first coil (primary coil) 310 is warped around the two cores 311 and 313 in opposite directions, such that under AC excitation, a varying magnetic field is induced in each core with similar strength but in the opposite direction, as schematically illustrated in the figure. Thus, the resulting hysteresis curve is symmetric.

The secondary coil 312 is wrapped around the two identical cores 311 and 313 and a voltmeter 320 is connected to the ends of the secondary coil 312 to measure the potential voltage that results from the induced magnetic field. With no external field, the measured voltage is zero. When an external field B is applied, the induced magnetic field in the cores 311 and 313 is no longer identical and the induced voltage V across the secondary coil 312 is proportional to the externally applied field B.

Figure 4:
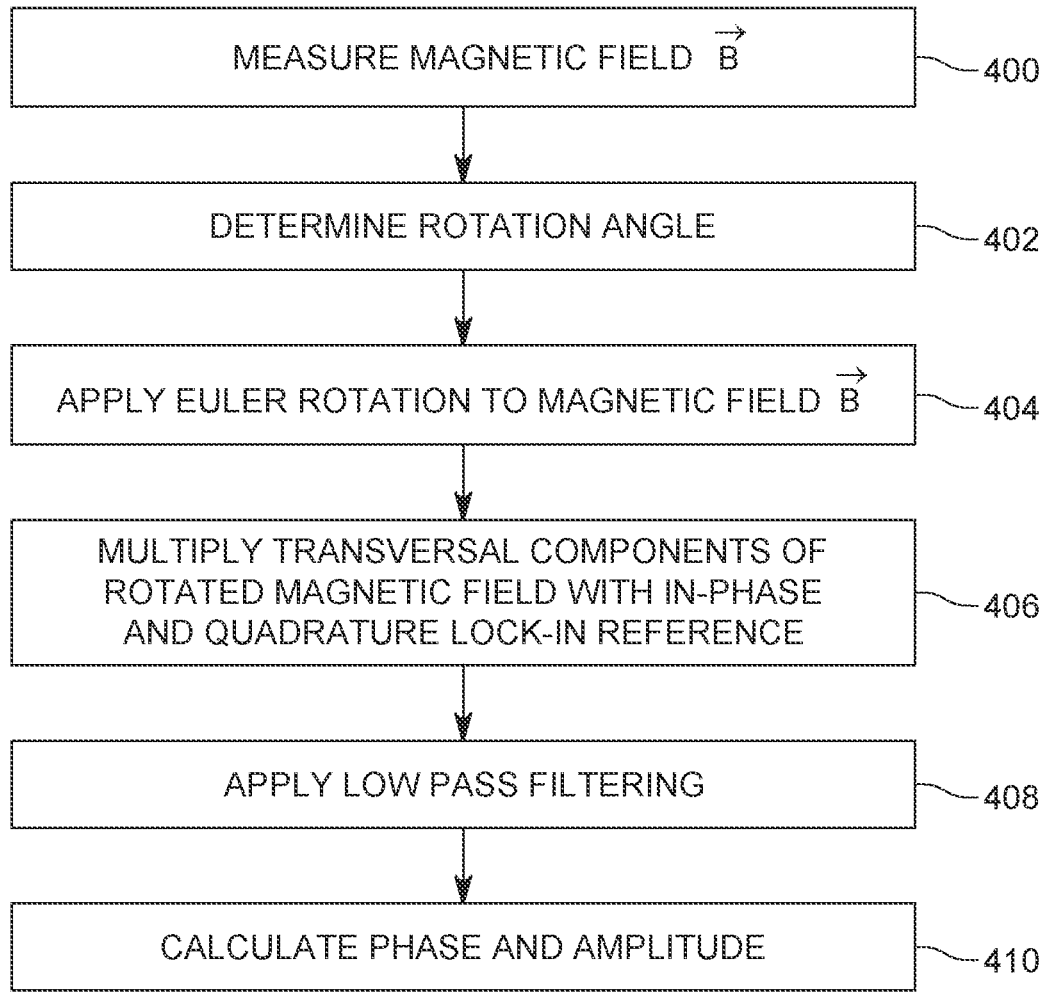
FIG. 4 is a flow chart of a method for calculating phase and amplitude of a magnetic field with a fluxgate magnetometer.

The fluxgate magnetometer 300 is configured to measure the magnitude of the magnetic field B and also its orientation, as now discussed with regard to FIG. 4. In other words, the fluxgate magnetometer 300 can measure the orthogonal field components of the magnetic field B in step 400. The measured field components in the remote field region (other regions exist, as discussed later) consist of a combination of DC and AC fields. The DC field is mainly due to the sum of the earth's magnetic field and the magnetic field induced because of magnetization of the casings. The AC part is mainly related to the exited field (i.e., the field generated by a transmitter, which is discussed later), and it is the measurement of interest. The following general expression can be written for the three orthogonal field components:

$$B = \begin{pmatrix} D_x + A \cdot \cos(\omega t + \theta_x) \\ D_y + B \cdot \cos(\omega t + \theta_y) \\ D_z + C \cdot \cos(\omega t + \theta_z) \end{pmatrix}, \tag{2}$$

where $D_x$, $D_y$, and $D_z$ are the DC magnetic field components in the X, Y, and Z directions, respectively; and A, B, and C are the amplitudes and $\theta_x$, $\theta_y$, and $\theta_z$ are the phases of the AC magnetic components in the X, Y, and Z directions, respectively. Note that axis Z is selected to coincide with the longitudinal axis of the well or pipe in which the magnetic field is measured.

The orientation of the magnetic field B may be expressed, relative to the sensing axes of the magnetometer 300, with the help of a Euler rotation matrix E(Φ), which is calculated in step 402, where the matrix is defined as:

$$E(\Phi) = \begin{pmatrix} \cos(\Phi) & -\sin(\Phi) & 0 \\ \sin(\Phi) & \cos(\Phi) & 0 \\ 0 & 0 & 1 \end{pmatrix}, \tag{3}$$

with the Z axis of the system of reference being aligned with the Z axis of the magnetometer (due to the value "1" in equation (3), and Φ is an angle that rotates the other sensing axes of the magnetometer onto the X and Y axes of the system of reference. For this case, the rotated magnetic field $B_r$ is calculated in step 404, and is given by:

$$B_r = B \cdot E(\Phi). \tag{4}$$

Assuming that the magnetometer is fitted in the center of the tubing, with the Z-axis in the axial (also called longitudinal) direction of the pipe, and X and Y extend in the transverse plane to the pipe, the rotated magnetic field $B_r$ in three dimensions can be written as:

$$B_r^T = \begin{bmatrix} B_{rx} \\ B_{ry} \\ B_{rz} \end{bmatrix} = \tag{5}$$

$$\begin{bmatrix} (D_x + A \cdot \cos(\omega t + \theta_x))\cos(\Phi) + (D_y + B \cdot \cos(\omega t + \theta_y))\sin(\Phi) \\ -(D_x + A \cdot \cos(\omega t + \theta_x))\sin(\Phi) + (D_y + B \cdot \cos(\omega t + \theta_y))\cos(\Phi) \\ D_z + C \cdot \cos(\omega t + \theta_z) \end{bmatrix}.$$

Phase-sensitive detection is next applied to extract the minute amplitude and the phase of the $B_{rx}$, $B_{ry}$ and $B_{rz}$ measured components. In this embodiment, this approach is achieved by multiplying each component of $$B_r^T,$$

in step 406, by in-phase and quadrature-phase lock-in references, and then applying in step 408 a low pass filtering. For example, the $B_{rx}$ component is processed as follows:

$$B_{rx-I} = B_{rx}\cos(\omega t), \tag{6}$$

$$B_{rx-Q} = B_{rx}\cos\left(\omega t + \frac{\pi}{2}\right), \tag{7}$$

where $B_{rx-I}$ (called herein the "lock-in magnetic field") is the $B_{rx}$ component multiplied with the in-phase reference and $B_{rx-Q}$ (called herein the "quadrature magnetic field") is the $B_{rx}$ component multiplied with the quadrature lock-in reference. The lock-in and the quadrature magnetic fields in equations (6) and (7) are then expanded into several modulated terms in step 408 and the low pass filtering is applied, which results in filtered lock-in and quadrature magnetic fields:

$$LPF(B_{rx-I}) = \frac{A}{2}\cos(\Phi)\cos(\theta_x) + \frac{B}{2}\sin(\Phi)\cos(\theta_y), \tag{8}$$

$$LPF(B_{rx-Q}) = \frac{A}{2}\cos(\Phi)\sin(\theta_x) + \frac{B}{2}\sin(\Phi)\sin(\theta_y). \tag{9}$$

Based on equations (8) and (9), the phase and the magnitude of the magnetic field $B_{rx}$ can be calculated in step 410, based on filtered lock-in and quadrature magnetic fields, as follows:

$$\text{Phase}_{B_{rx}} = \angle B_{rx} = \tan^{-1}\frac{LPF(B_{rx-Q})}{LPF(B_{rx-I})}, \tag{10}$$

$$\text{Magnitude}_{B_{rx}} = |B_{rx}| = \sqrt{LPF(B_{rx-I})^2 + LPF(B_{rx-Q})^2}. \tag{11}$$

The phase and magnitude of the other two components $B_{ry}$ and $B_{rz}$ of the magnetic field $B_r$ may be similarly calculated. The azimuthal-dependency of the magnitude in equation (11) and in the phase in equation (10) of the radial components make them appropriate for solving the problems of the existing remote field eddy current tools discussed in the Background section.

Figure 5:
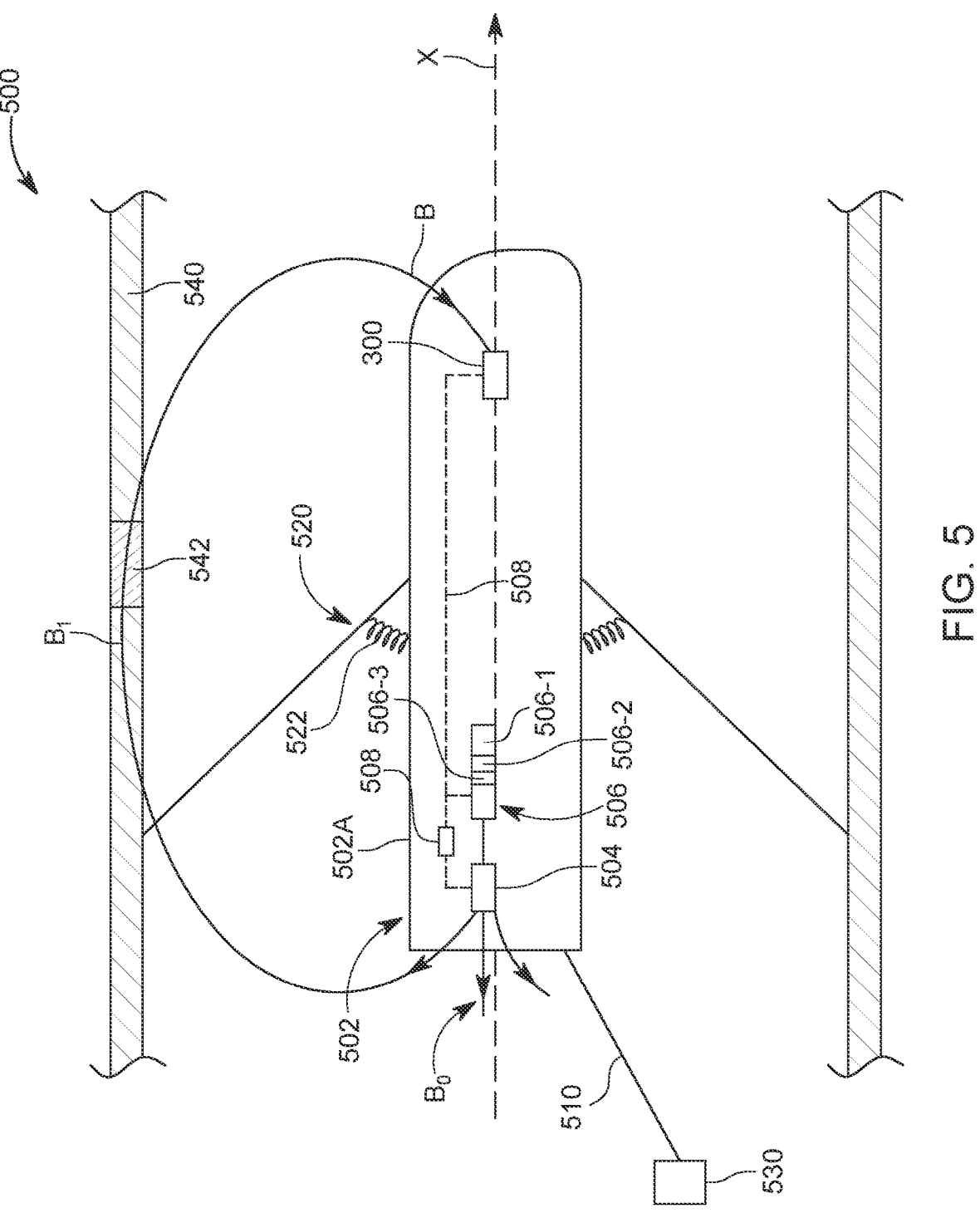
FIG. 5 is a schematic diagram of a defect detection system in a pipe based on a fluxgate magnetometer.

The method discussed above with regard to FIG. 4 may be implemented with a novel RFEC system 500 as illustrated in FIG. 5. The system 500 includes a holder 502, which extends along the longitudinal axis X. The holder 502 may be shaped to be like a bullet, cylinder, tube, etc. so that it fits inside a pipe or well that is desired to be explored. The shape may also be selected to promote a motion of the holder through the pipe. The holder 502 may be made of any non-magnetic material, to avoid magnetic field deformation or attenuation. The holder 502 is configured to hold one or more magnetic field generators 504. The magnetic field generator (e.g., a coil) may be located inside or on the external surface 502A of the holder 502. The magnetic field generator (also called "transmitter") 502 may be connected to a controller 506 (for example, a processor), which instructs the transmitter when to generate a magnetic field. The transmitter may include one or more coils for generating a first magnetic field, for example, a reference magnetic field $B_0$. A power source 508 may be also located inside the holder 502, for powering the transmitter and the controller. The power source may be a battery or any other known means for generating electrical power. The controller 506 may instruct the transmitter to generate the reference magnetic field $B_0$ as a sinusoid with the angular frequency ω and phase θ, as discussed above with regard to equation (2). For example, the angular frequency and the phase of the generated magnetic field are proportional to the angular frequency and the phase of the injected current into the coil of the transmitter. Thus, by adjusting these parameters of the injected electrical current, the frequency of the generated magnetic field can be adjusted. If there are multiple transmitters 504, multiple magnetic fields may be generated, simultaneously or sequentially, with different frequencies.

System 500 further includes one or more fluxgate magnetometers 300, as illustrated in FIG. 3. The magnetometer 300 may be located within or on the external surface 502A of the holder 502. The signals recorded by the magnetometer 300, the second magnetic field, i.e., the measured magnetic field B of equation (2), are provided to the controller 506 for processing, along a connection 508 between the magnetometer 300 and the controller 506. The magnetometer 300 is provided to an opposite end of the holder 502, to space it apart from the transmitter 504. In one application, the transmitter and the magnetometer are provided along the longitudinal axis X of the holder 502. The distance between these two elements along the longitudinal axis X is discussed later.

If the system 500 is used for detecting corrosion in a vertical pipe, it may have an external cable 510 linked to one or more of the components of the system, for providing electrical power and retrieving the measured signals, for remote signal processing. The external cable 510 may be connected to a global controller 530, for example, located at the surface when a well is investigated. The global controller 530 may include, similar to controller 506, one or more processors, one or more memories, and any other component that is necessary for hosting and running a machine learning algorithm. If no external cable 510 is present, the controller 506 may be configured to either store the measured signals for later processing or may be configured to provide some or full signal processing. If system 500 is used in a horizontal pipe or pipes for inspection, then the system may have one or more wings 520 so that the fluid flow through the pipe propels the holder 502 along the pipe. The wings may also be used for centralizing the holder inside the pipe. Wing 520 may be provided with a compression means 522, for example, a spring, for pushing the wing away from the body of the holder. Note that the first magnetic field $B_0$ partially exists in the wall of the pipe 540, as a third magnetic field $B_1$, as shown in the figure. The strength and phase of the third magnetic field is affected by the condition of the pipe 540 and for this reason it is labeled $B_1$ and not $B_0$. For example, for a corrosion defect 542 located in the wall of the pipe 540, the strength and/or phase of the measured magnetic field B is different from the strength and/or phase of the same field when the pipe is not corroded. In other words, the condition of the pipe influences the strength and/or phase of the third magnetic field, and as a consequence of this, the measured second magnetic field differs for the same pipe, depending on the location and extent of the corrosion region. Using this feature of the magnetic field, the location and extent (e.g., percentage) of the corrosion of the pipe can be determined based on the measured 3-axis magnetic field B.

The working principle and some of the advantages of the system 500 are now discussed. In this embodiment, simulation of the RFEC problem is carried out using the finite-difference frequency-domain (FDFD) method, which solves the Helmholtz equation for the electric field. Then, magnetic fields are obtained by taking the curl of the electric field. The FDFD method discretizes the spatial derivatives in the Helmholtz equation using finite differences. This yields a linear matrix equation Ax=b, where matrix A depends on the grid sizes along X, Y and Z directions, the material properties of the pipe, and the frequency, the unknown vector x stores the samples of the (unknown) electric field on the finite-difference grid, and the vector b contains samples of the source terms. This matrix system is solved using an iterative solver. Once the solution for the electric field is obtained, the magnetic field is computed by applying the curl operator, which is discretized using finite differences, to the electric field samples. The grid used by the FDFD method in this embodiment consists of staggered Yee cells discretizing the computation domain. The computation domain in this specific embodiment involves a double pipe setup (a 4½ in (11.43 cm) pipe placed inside a 7 in (17.78 cm)) with/without metal loss, a transmitter coil (multi-layer and multi-turn) 504, and a receiver point 300 (instead of a receiver coil) located in the remote field region. Both the transmitter coil and the receiver point are located along the longitudinal axis of the pipe. Additionally, a first order absorbing boundary condition is used on the outer boundaries of the computation domain to approximate the open space problem. The axial and radial field behaviors in the remote field region are studied with this setup in the presence of a local 3×3 cm defect located on the 2nd pipe (the external pipe) to assess the azimuthal-sensitivity described by equations (10) and (11).

Figure 6A:
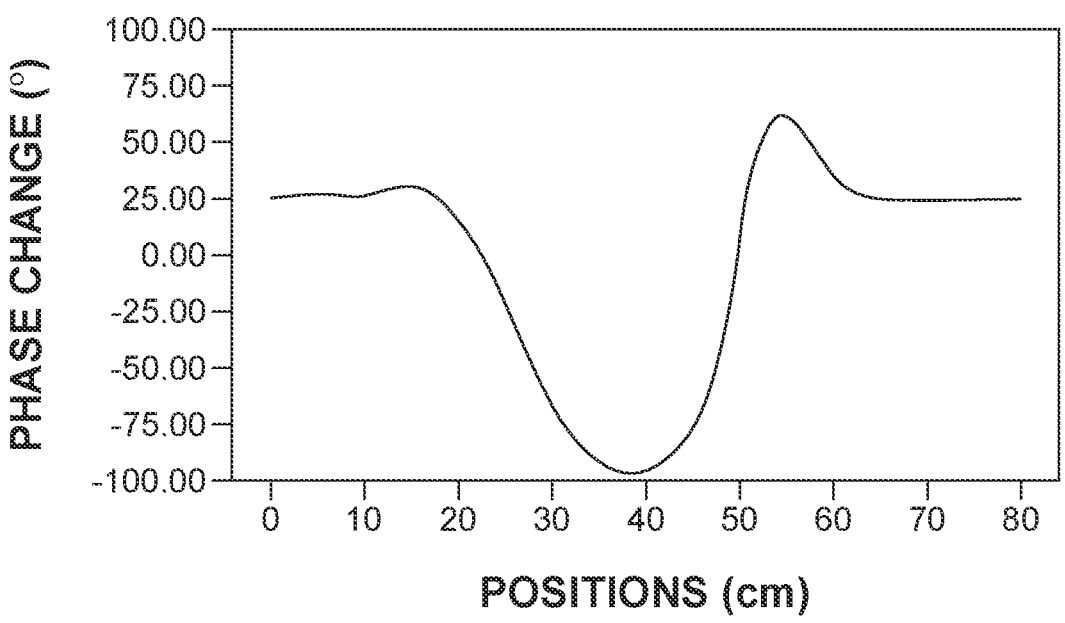
FIGS. 6A to 6C illustrate the influence of a simulated defect in a pipe as reflected in the phase measurements performed with the system of FIG. 5.
Figure 6B:
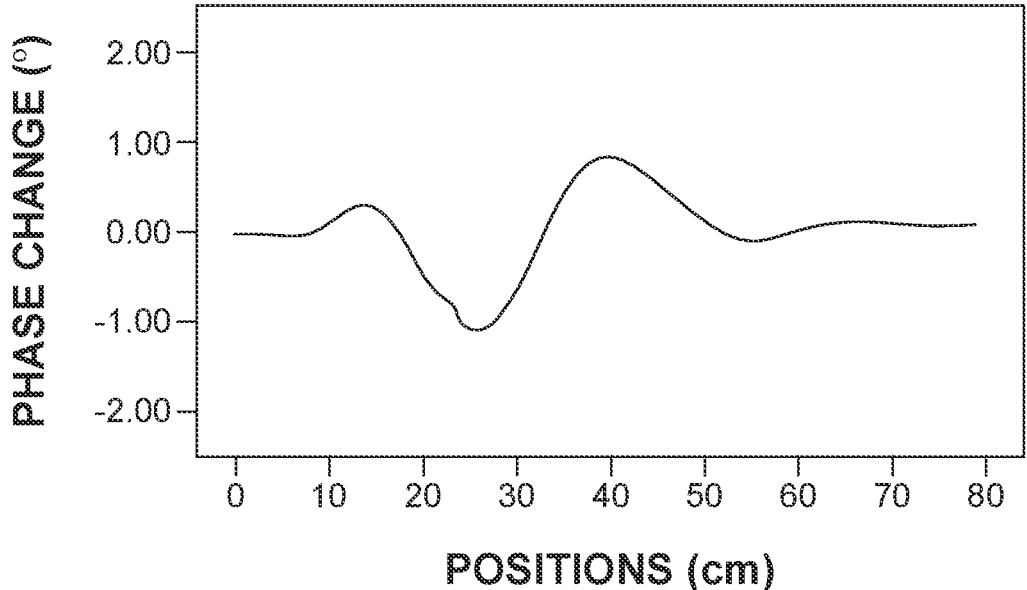
Figure 6C:
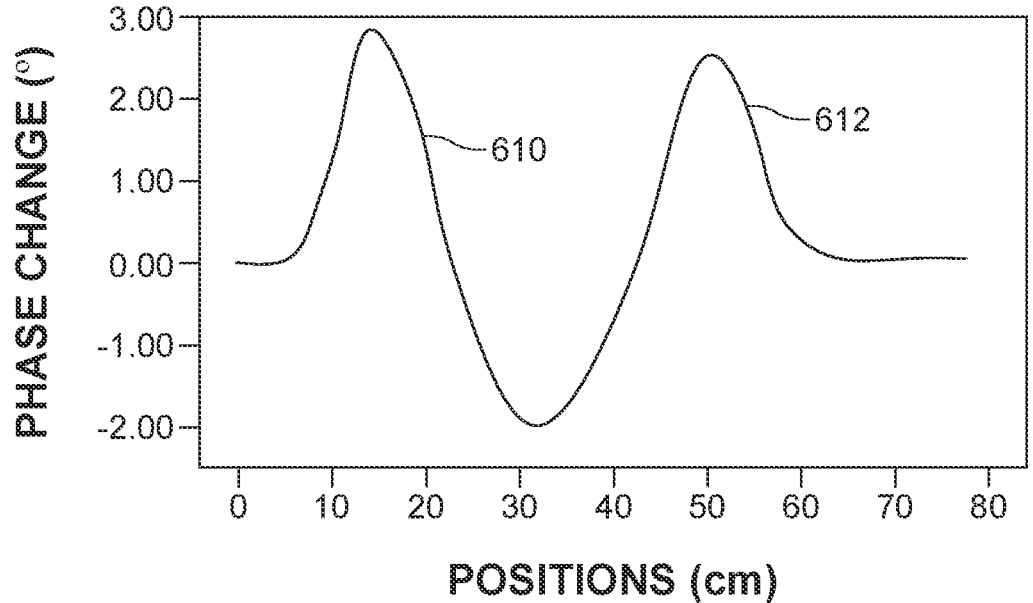

FIGS. 6A to 6C show the X, Y, and Z phase components (the phase described by equation (10)) for the simulated defect of 3 by 3 cm in the external pipe of a double pipe setup. All field components are measured in the center of the tubing with axis X in the direction of the defect (underneath it), axis Y at 90° with respect to the defect, and Z is pointing along the axial direction of the pipes, parallel to the defect surface. The axial component along the Z direction in FIG. 6C shows the typical two-peak response usually reported in the literature. The first peak 610 is observed when the magnetometer 300 (also called herein the "receiver") passes under the defect and the second peak 612 is observed when the transmitter 504 passes under the defect. The radial X component in FIG. 6A shows a noticeably higher anomaly than the axial Z component. The Y component shown in FIG. 6B exhibits a small anomaly at 90° with reference to the defect. Note that in case no defect is present in any of the pipes, the phases in FIGS. 6A to 6C should be represented by a straight, horizontal line. Also note that the defect is present at the position of about 40 cm on the abscissa of the graphs 6A to 6C, and the receiver moves above and below the defect to obtain the phases at positions between 0 to 80 cm.

Figure 7A:
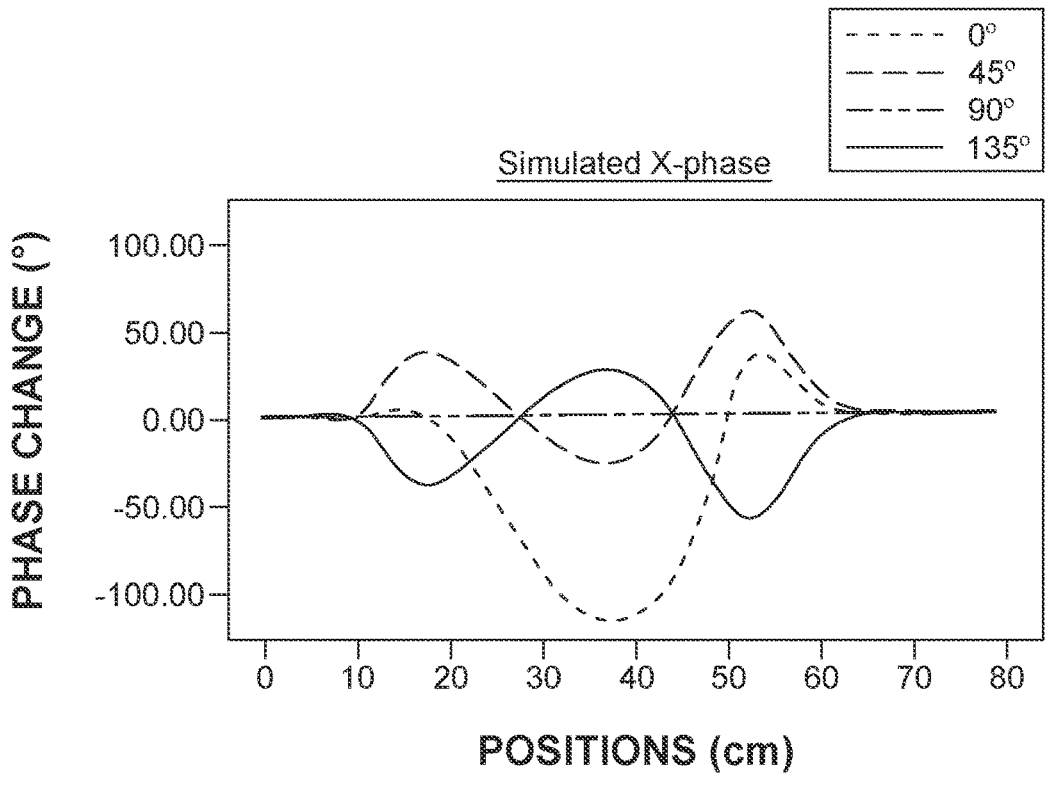
FIGS. 7A and 7B illustrate the influence of the angular (azimuthal) location of the simulated defect in the pipe in the phase measurements performed with the system of FIG. 5.
Figure 7B:
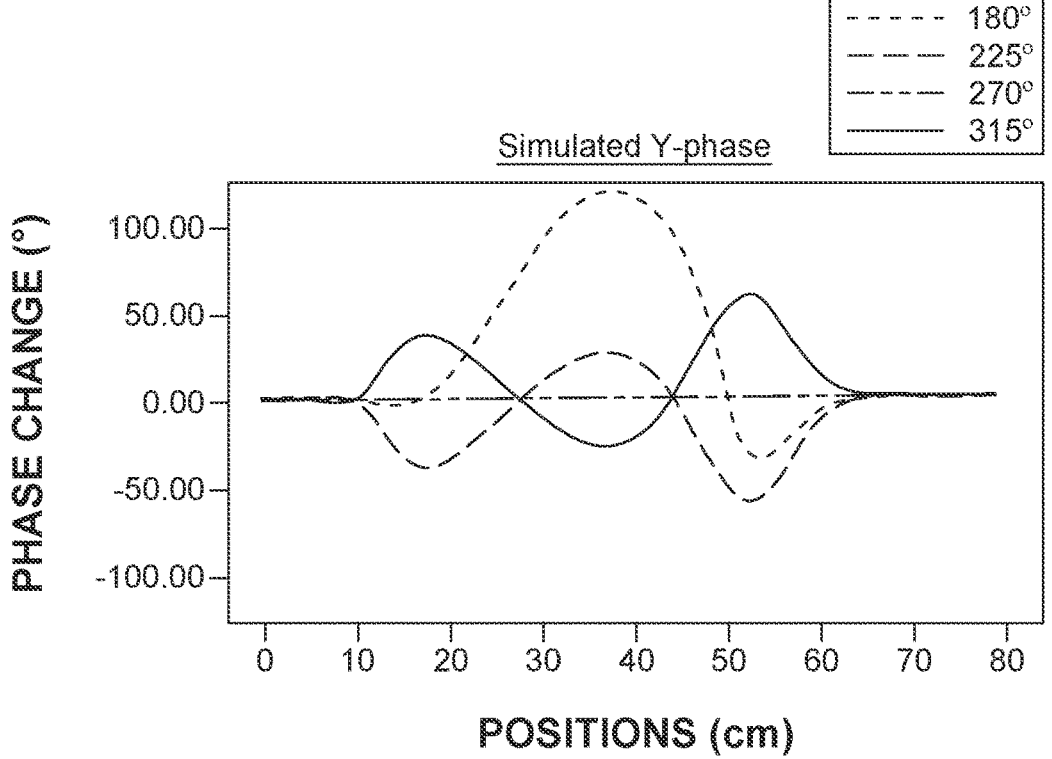
Figure 9A:
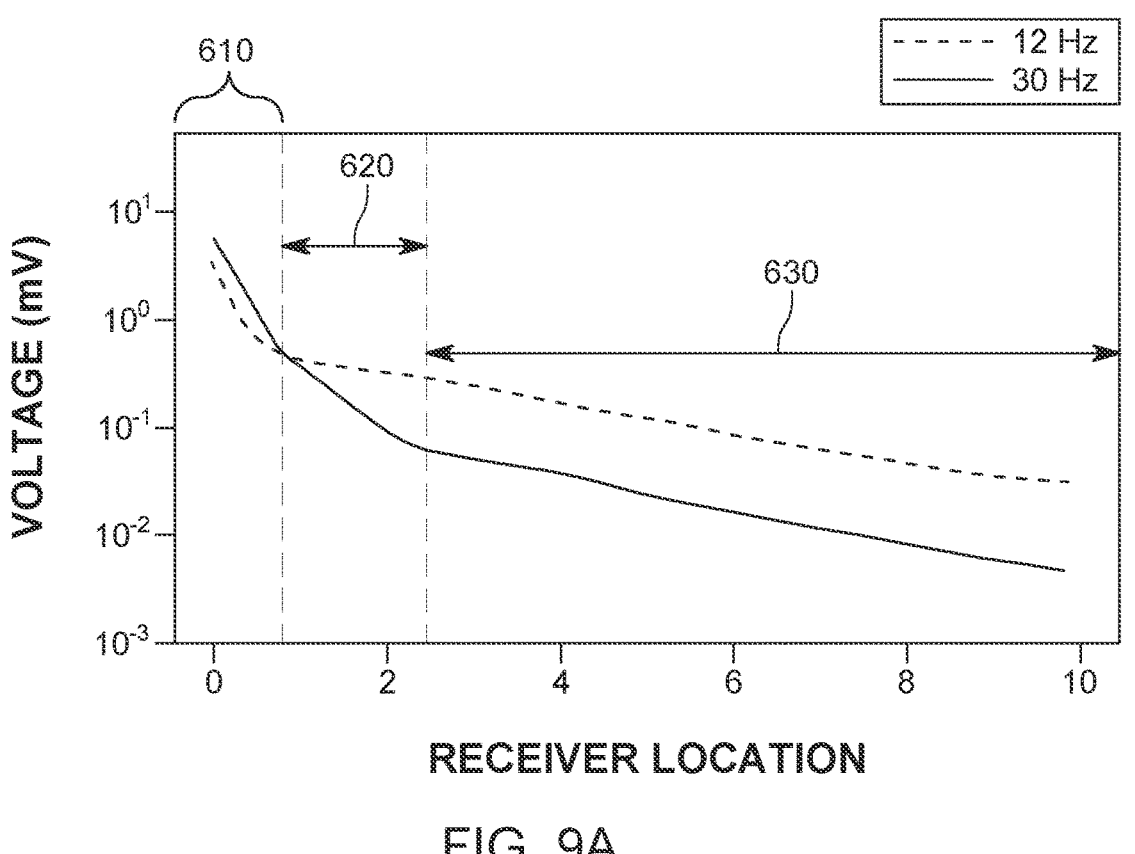
FIGS. 9A to 9F illustrate the radial and axial phase and magnitude profiles for a push-in test in a single pipe at two different frequencies.
Figure 9B:
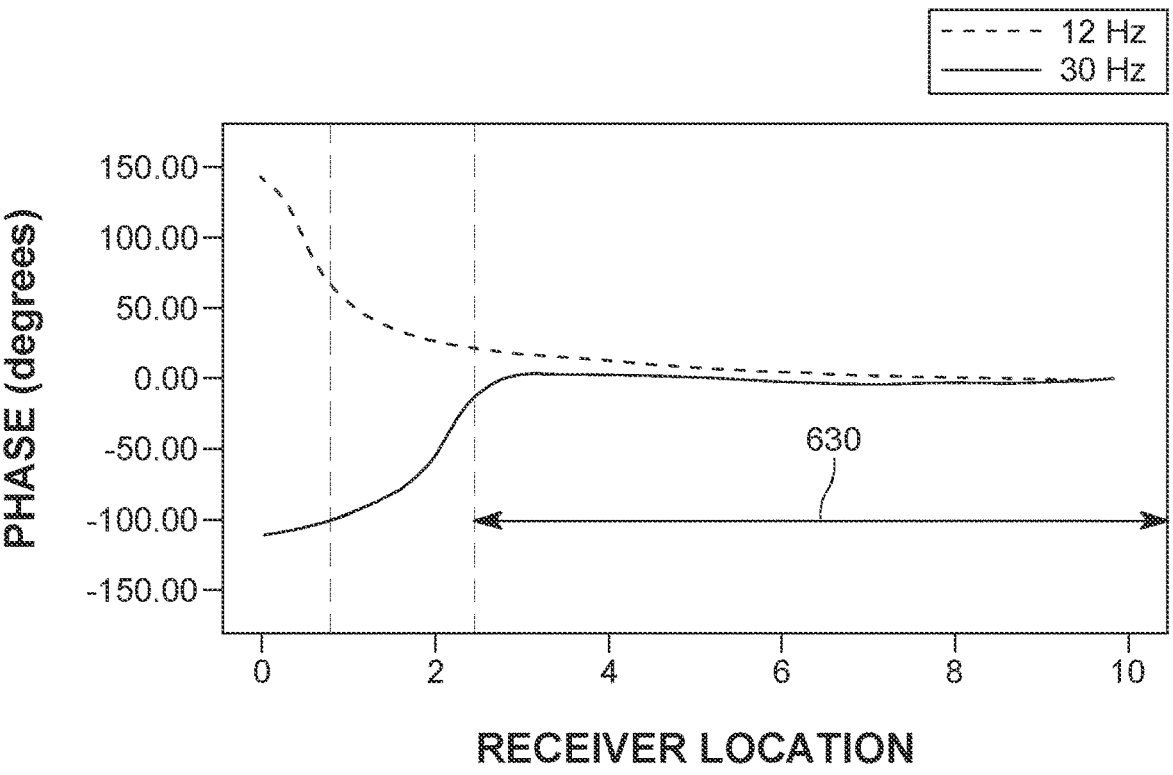
Figures 9C, 9D:
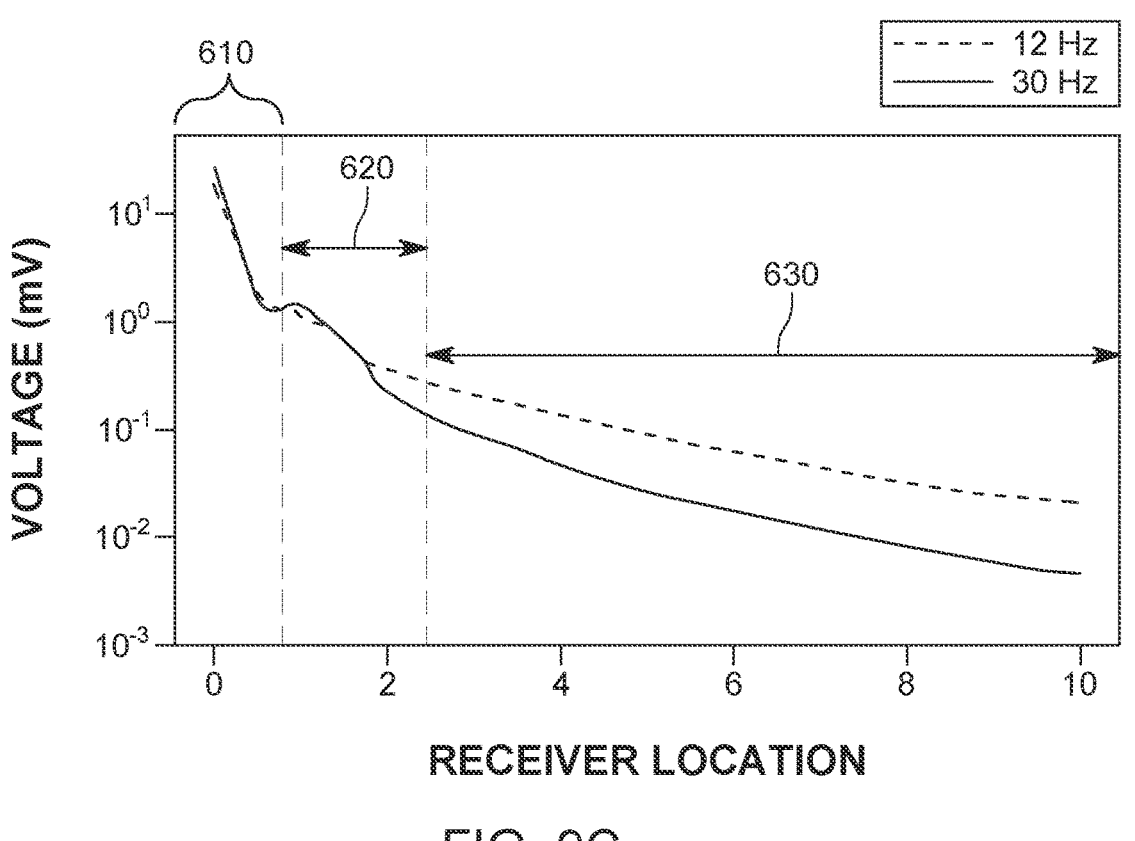
Figures 9E, 9F:
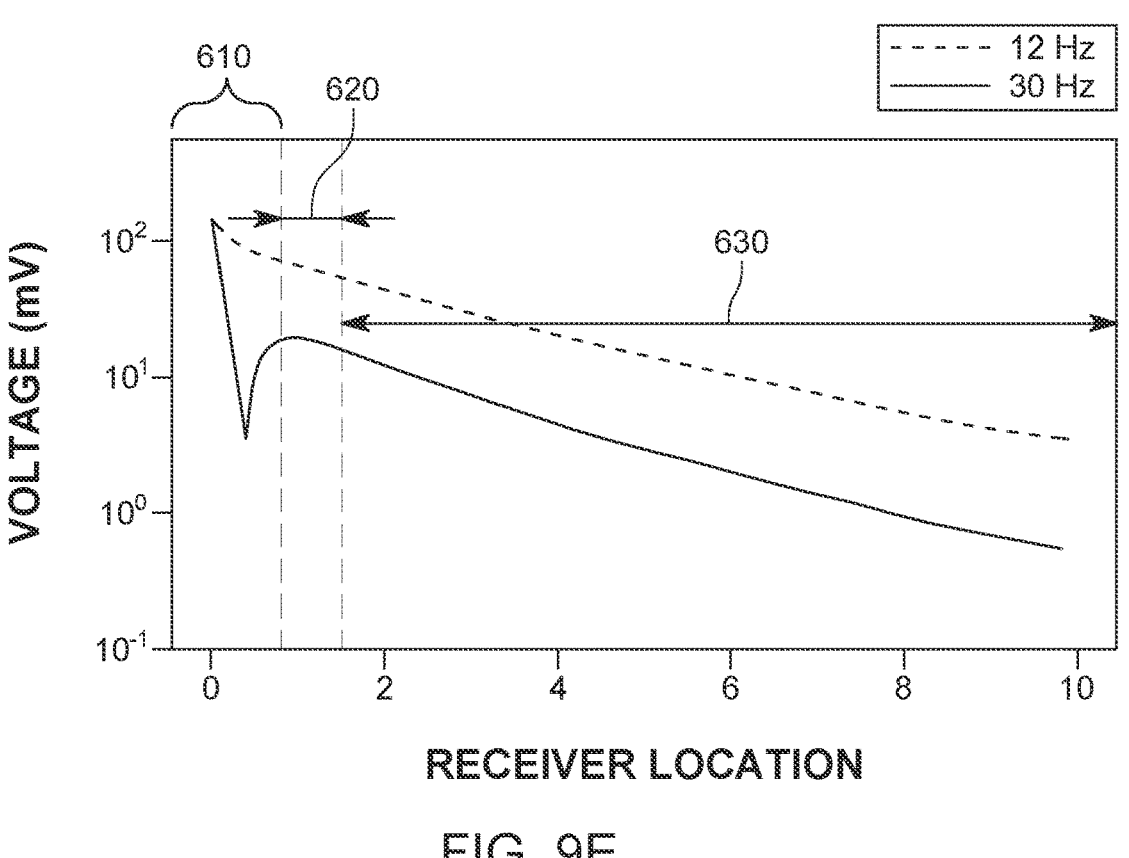

The defect in one or both pipes influences the measured magnetic field B in a unique manner, i.e., it acts as a fingerprint, so that the existing defect can be detected and mapped to the recorded signal. In other words, each defect in one or both of the pipes uniquely affects the magnetic field that propagates in specific direction through the pipes and thus, the recorded magnetic field B can be unequivocally mapped to the location of the defect with reference to the sensing element of the 3-axis magnetometer, and its extent in the pipes. To demonstrate the azimuthal-sensitivity of the method of FIG. 4 and associated system of FIG. 5 relative to the location of the defect, the defect in the pipe is rotated by several angles. FIGS. 7A and 7B show the phase of the magnetic field along the X and Y directions for different values of the rotation angle of the defect. Different phase behaviors are noted in the figures for the different angles, with a clear symmetry between the opposite angles (i.e., 45-135 and 225-315). Thus, these directional features of the radial field behavior can be exploited to estimate the azimuthal location of the defect. For example, in one application, machine learning is trained with known defects (azimuthal location and extent of the defects) in the pipes and the measured magnetic fields are mapped to the distribution and percentage of the defects. Then, the trained machine learning is fed with new 3-axis magnetic field B measurements for determining the location of the defects and their extent. Other methods for defect location and extent may be used.

The inventors built the system 500 and tested it with one and two pipe setups having various defects, as illustrated in the table of FIG. 8. This figure shows three types of defects, the first two in a single pipe and the third one in a double pipe configuration. The controller 506 includes, in this embodiment, a function generator 506-1 circuit, which provides an excitation signal which is fed to a power amplifier 506-2 to drive the transmitter coil 504. A lock-in amplifier 506-3 is used as a phase-sensitive receiver for the three-axis magnetometer 300 measurements. Note that the elements 506-1 to 506-3 may be implemented in software, as part of the controller 506, or they may be implemented in hardware or as a combination of software and hardware. The experiments were conducted in a single pipe (4½ in diameter) and double pipes (4½ in inside a 7 in).

The first tests were conducted as push-in tests, where the fluxgate magnetometer 300 is gradually pushed toward transmitter 504, inside the testing pipe. Note that for the system 500, the fluxgate magnetometer 300 is fixedly spaced from the transmitter 504, i.e., their separation distance cannot vary. However, in one application, it is possible to make either the transmitter 504 or the receiver 300 to move relative to the holder so that a distance between the two elements can be adjusted as desired, depending on the number of pipes to be investigated. For example, it is possible to attach either the transmitter or the receiver to a rail and to provide an electrical motor to move the transmitter or receiver along the rail, to adjust the distance between them. For this test, the two elements were not placed in the same holder 502 so that one can be moved relative to the other one. This test is performed to characterize the near, transition, and remote field regions. At the beginning of the test, the measured phase is offset to zero, then the magnetometer 300 is pushed in small steps toward the transmitter 504 while the magnitude and phase of the magnetic field components along X, Y and Z directions are recorded. This test is conducted in intact, single and double pipe setups.

FIGS. 9A to 9F show the results of the single pipe test, for two different frequencies, while FIGS. 10A to 10F show the results for the double pipe test, also for two different frequencies. It is noted that two or more frequencies are used because a first frequency is selected for investigating the inner pipe and the second frequency is selected for investigating the outer pipe. In this regard, the second frequency is a small frequency, for example, below 15 Hz and the first frequency is a large frequency, for example, above 15 Hz. While the first frequency is capable of propagating along the inner pipe and then entering the magnetometer 300, the first frequency is too much attenuated in the second pipe to be detected by the magnetometer 300. However, the second frequency does not have this problem due to its small value.

The test was performed in this embodiment with the first frequency being 12 Hz and the second frequency being 30 Hz; these two frequencies were selected to obtain a skin depth equivalent to the one and two pipe-wall thickness respectively. Three regions, near 610, transit 620, and remote field 630, in terms of the distance of the receiver to the transmitter, were investigated and characterized by evaluating both the magnitude and the phase profiles. In the near field zone 610, for the magnitude responses on the X axis (FIG. 9A), on the Y axis (FIG. 9C) and on the Z axis (FIG. 9E), a sharp decay in the amplitude can be observed. The decay becomes shallower in the transition region 620 and finally reaches a steady slope for the remote field region 630, which suggests that the remote field region should be used for corrosion inspection. Note that the receiver location (on the abscissa in FIGS. 9A, 9C, and 9E) is measured as multiples of the first casing's inner diameter. Similar behavior can also be noticed in the phase graphs of FIGS. 9B, 9D, and 9F, but with a much shallower slope in the remote field region 630, where the indirect coupling path dominates. The transition region 620 is indistinct from the remote field region 630 for the axial component (Z) and the remote field region 630 is considered to start at about 1.5 the inner diameter of the inner pipe for this case (see FIGS. 9E and 9F). Three different slopes (for the three different regions) are observed for the radial components X and Y, and the remote field region 630 roughly starts at about 2.5 the inner diameter (see FIGS. 9A to 9D). It noted that the radial measurements (i.e., axes X and Y) have a higher sensitivity to the metal thickness than the axial component (axis Z), although the measured amplitude in the radial direction is about an order of magnitude less than the axial component. This fact further supports the advantage of employing frequency-independent and highly sensitive magnetometers instead of coils for measuring the radial field.

Figure 10A:
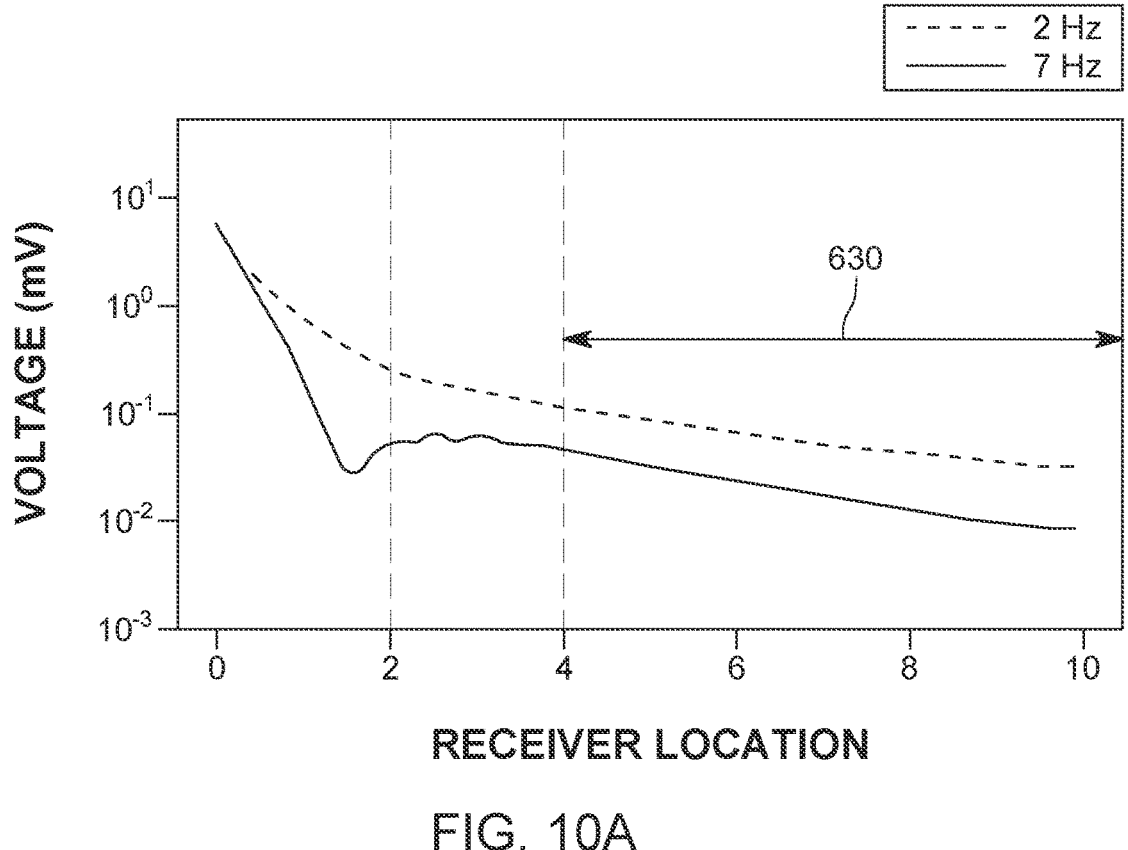
FIGS. 10A to 10F illustrate the radial and axial phase and magnitude profiles for a push-in test in a double pipe setup at two different frequencies.
Figure 10B:
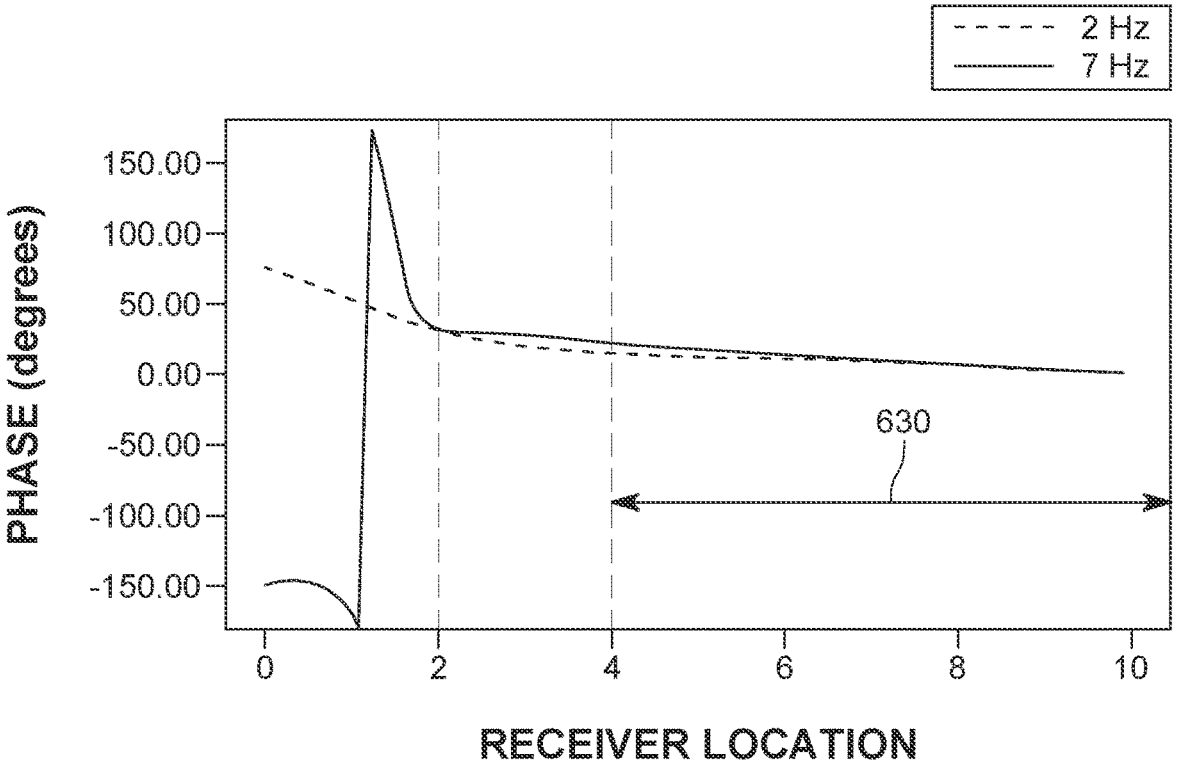
Figures 10C, 10D:
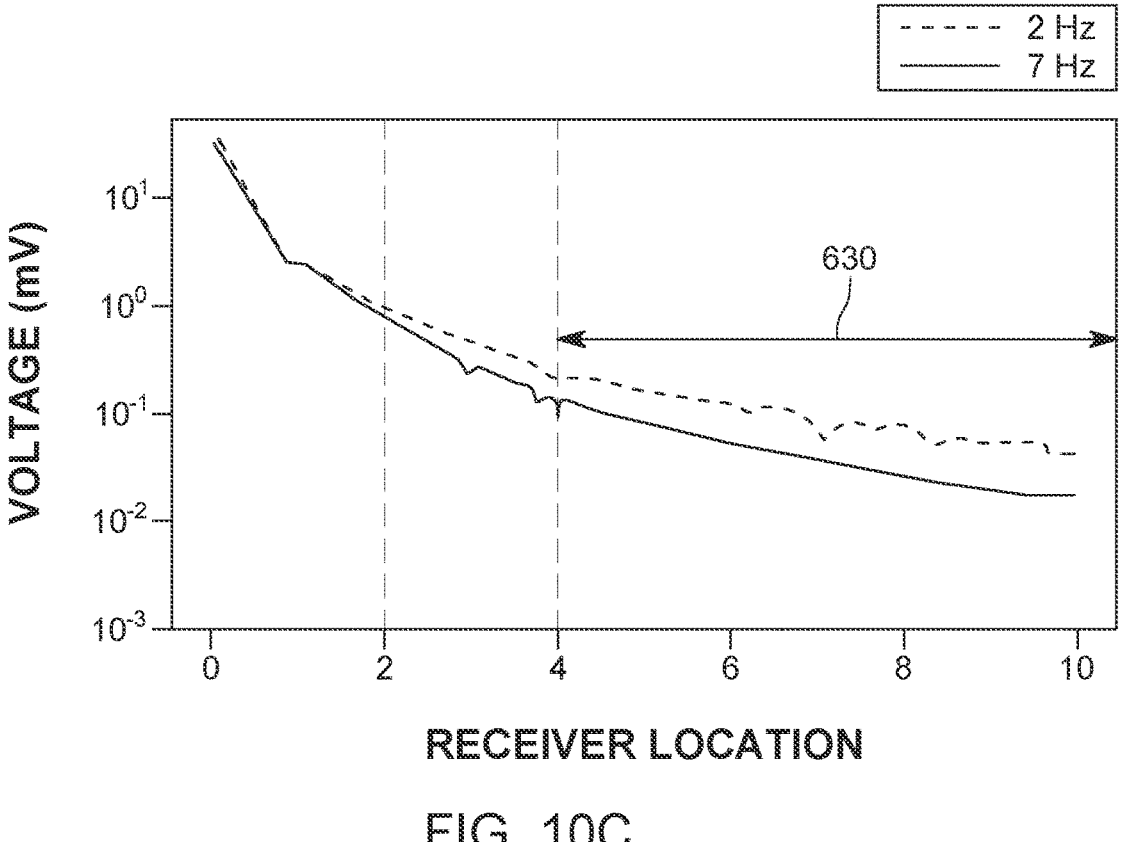
Figure 10E:
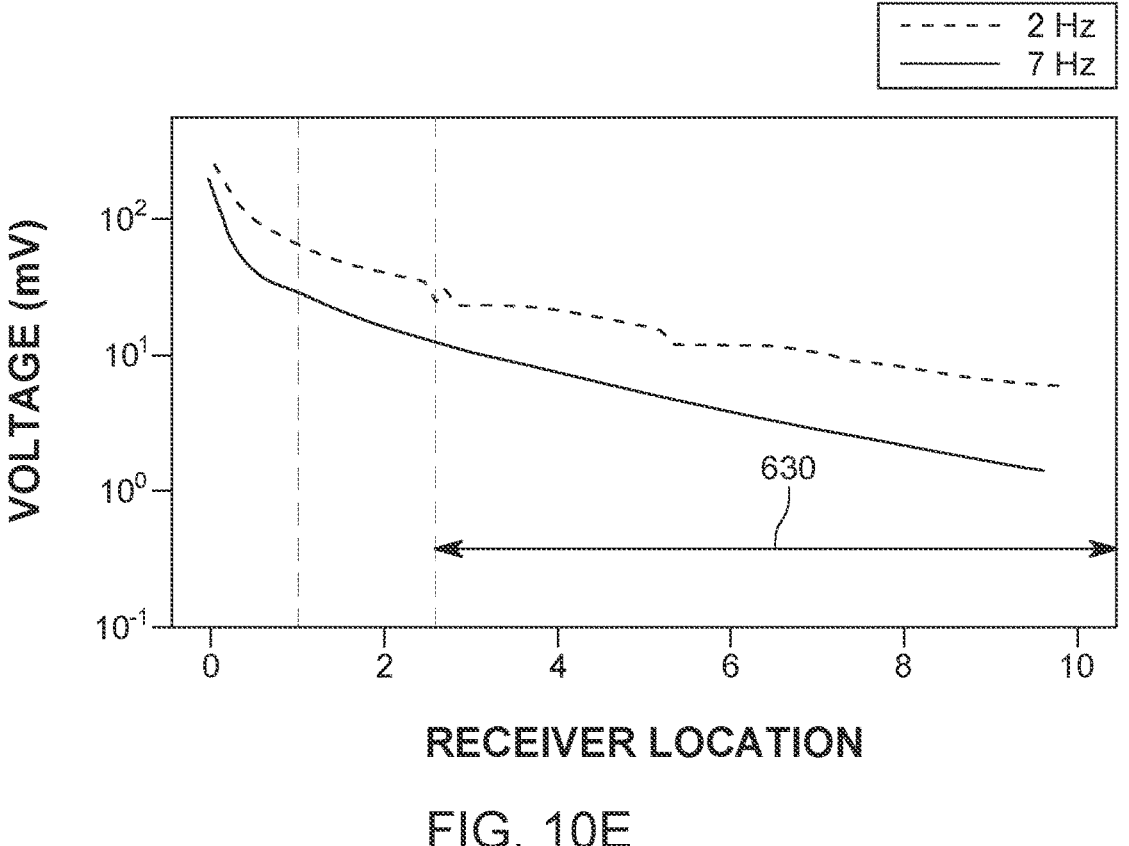
Figure 10F:
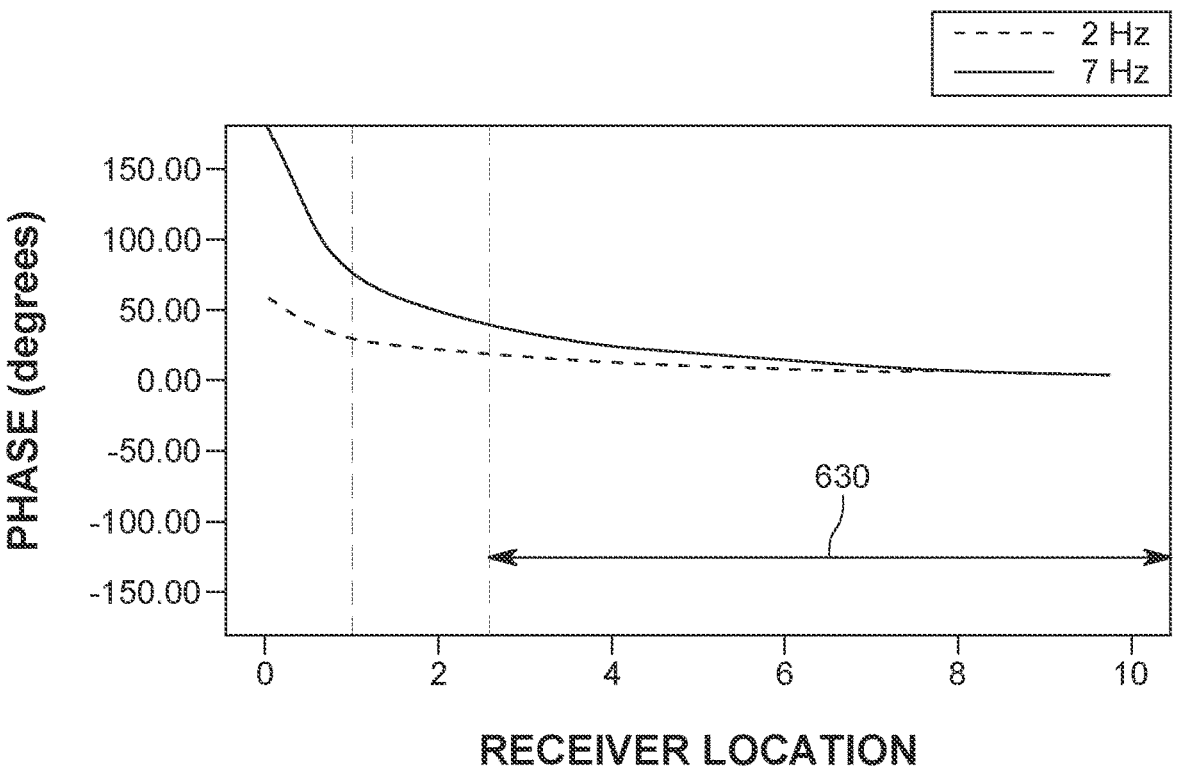

The results obtained from the push-in tests for the double pipe setup are illustrated in FIGS. 10A to 10F, with FIGS. 10A, 10C and 10E showing the magnitude responses for the X, Y, and Z axes, respectively, and FIGS. 10B, 10D, and 10F showing the phase responses for the X, Y, and Z axes. Generally, the same conclusions can be drawn as with the single pipe setup discussed above with regard to FIGS. 9A to 9F. However, the edge of the remote field region 630 is now extended. For the axial components, the remote field region 630 starts now at 2.5 the inner diameter of the first pipe instead of 1.5 as in the previous case, and for the radial components it starts at 4 times the inner diameter of the first pipe instead of 2.5. The ratio of the change is 1.6 and it is the same ratio between the second pipe's diameter to the inner pipe's diameter. Therefore, the inventors have concluded that the diameter of the outer casing/pipe mainly dictates the start of the remote field region 630 and implicitly the distance between the receiver and transmitter in the holder for the system 500. The longer the distance, the weaker the magnetic field is. This is another fact demonstrating the potential benefit of using a sensitive magnetometer when inspecting a system having multiple casings. In one embodiment, the distance between the receiver and the transmitter in the system 500 is selected to be about 4 times the diameter of the inner pipe as the radial components are used for determining the azimuth and extent of the defect.

The results shown in FIGS. 9A to 10F indicate that using appropriate frequencies and the measurements (magnitude and/or phase) of the magnetic field B for the remote field region, it is possible to characterize possible defects in one pipe or plural pipes that are distributed inside each other. The inventors next performed tests, using only the remote field region, to demonstrate that the radial distribution of the defects, in one or two pipes, can be identified by using the system 500. FIGS. 11A to 11D show the in-phase amplitude responses and the phase responses for the radial components (X and Y axes) and FIGS. 11E and 11F show the magnitude responses and the phase responses for the axial component (Z axis). All these results are for the single pipe test. The tests were performed for the defects illustrated in FIG. 8. The spacing between the transmitter and the receiver magnetometer for the single pipe test is 25 cm. These distances were selected based on the observations from FIGS. 9A to 10F.

Figure 11A:
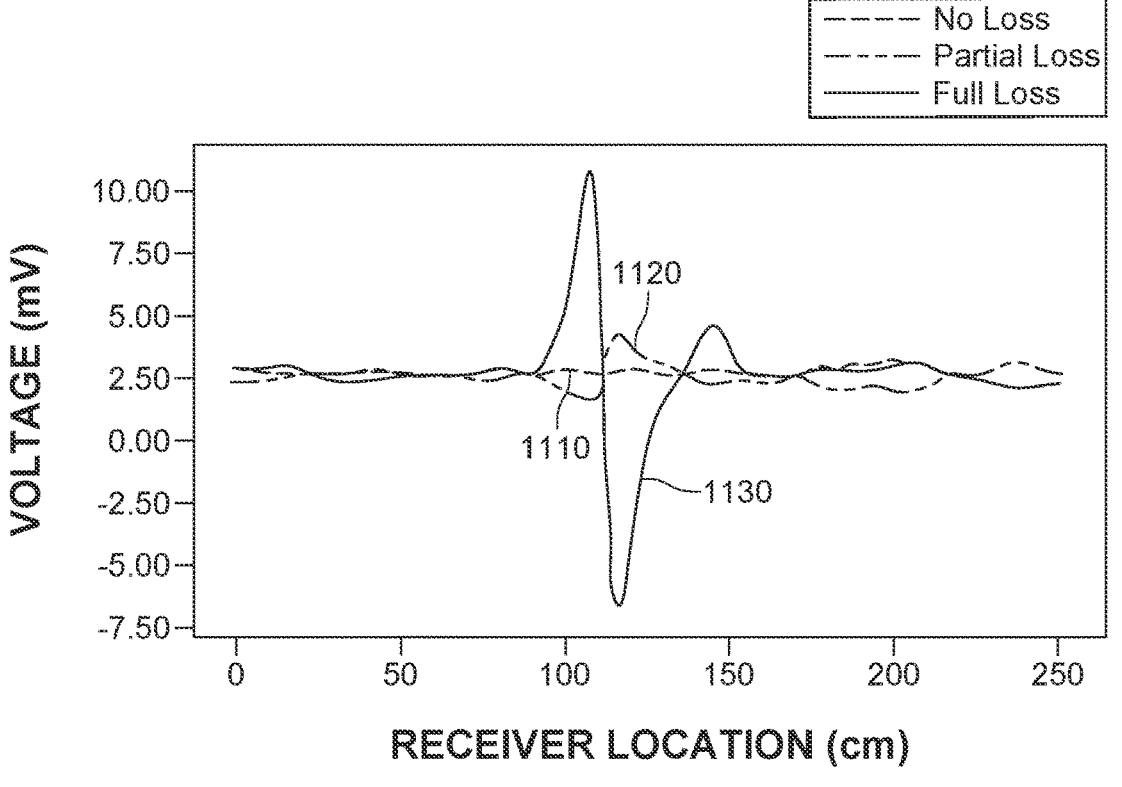
FIGS. 11A to 11F illustrate single pipe partial and full loss magnitude and phase responses for the radial and axial directions.
Figure 11B:
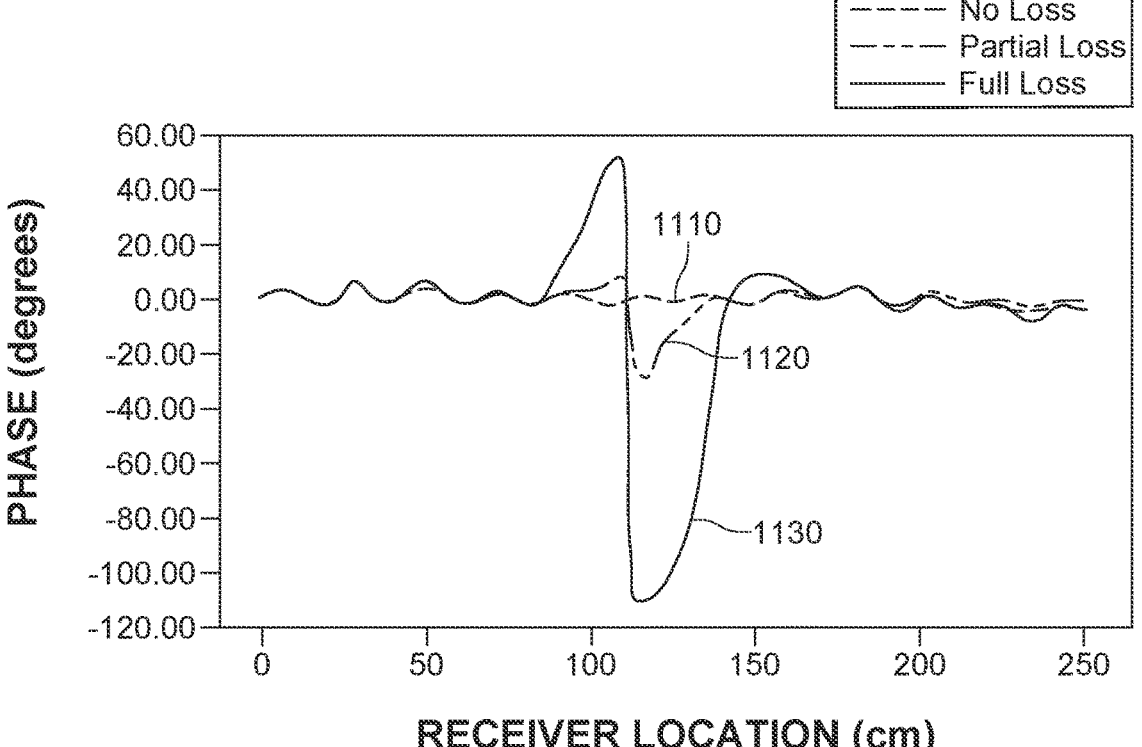
Figure 11C:
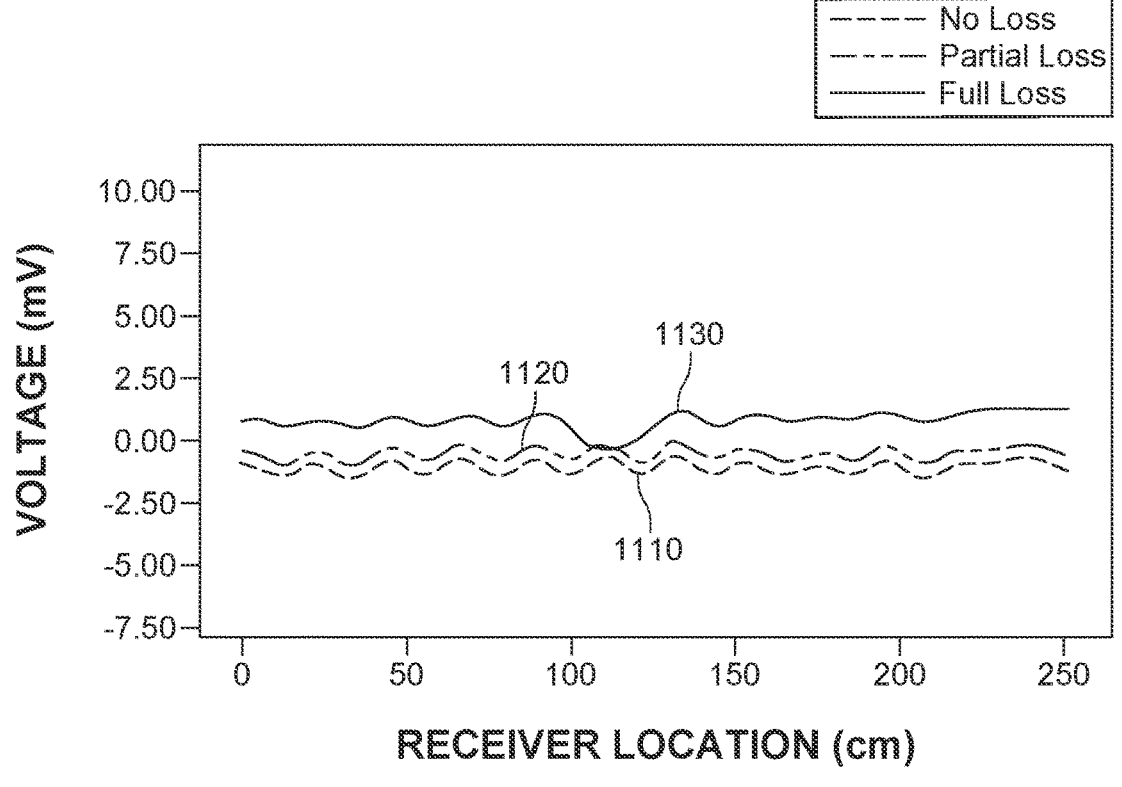
Figure 11D:
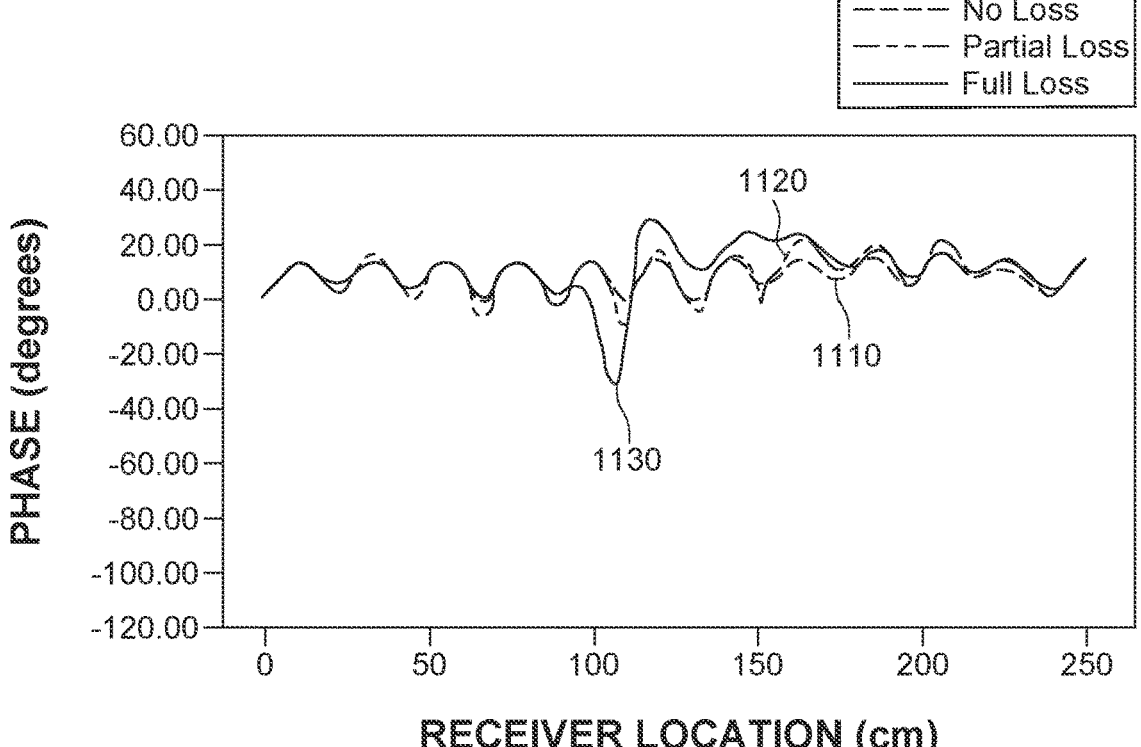
Figure 11E:
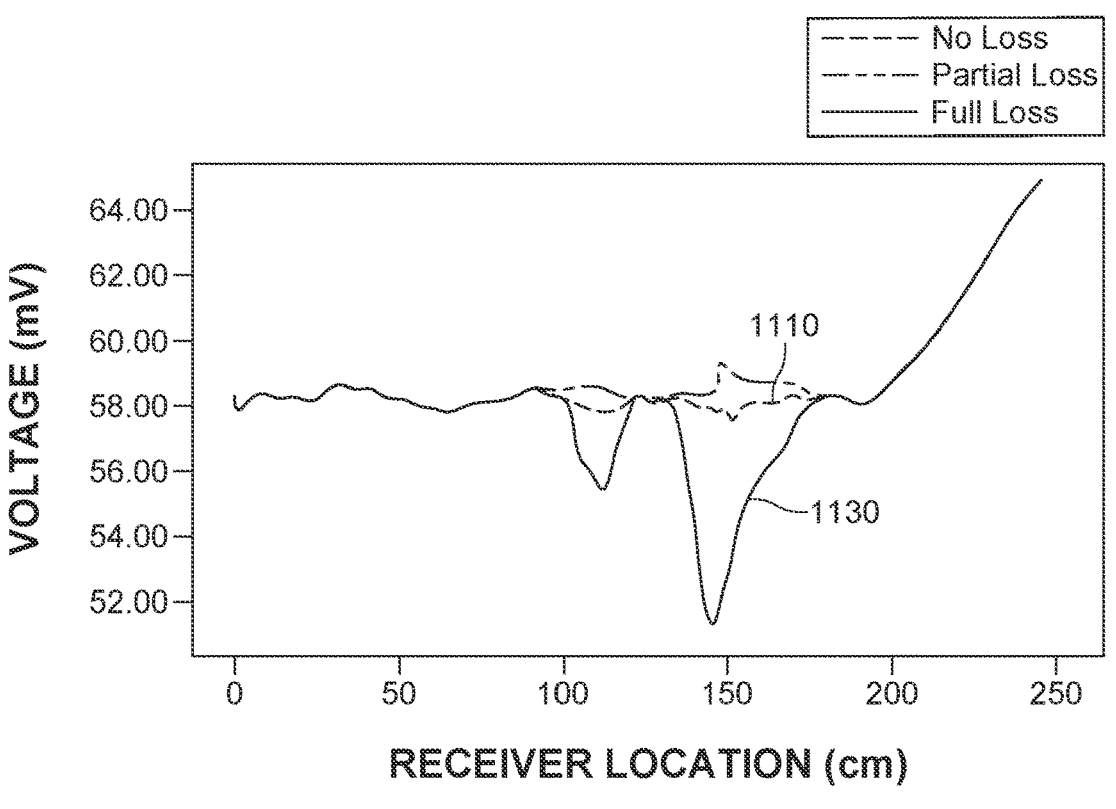
Figure 11F:
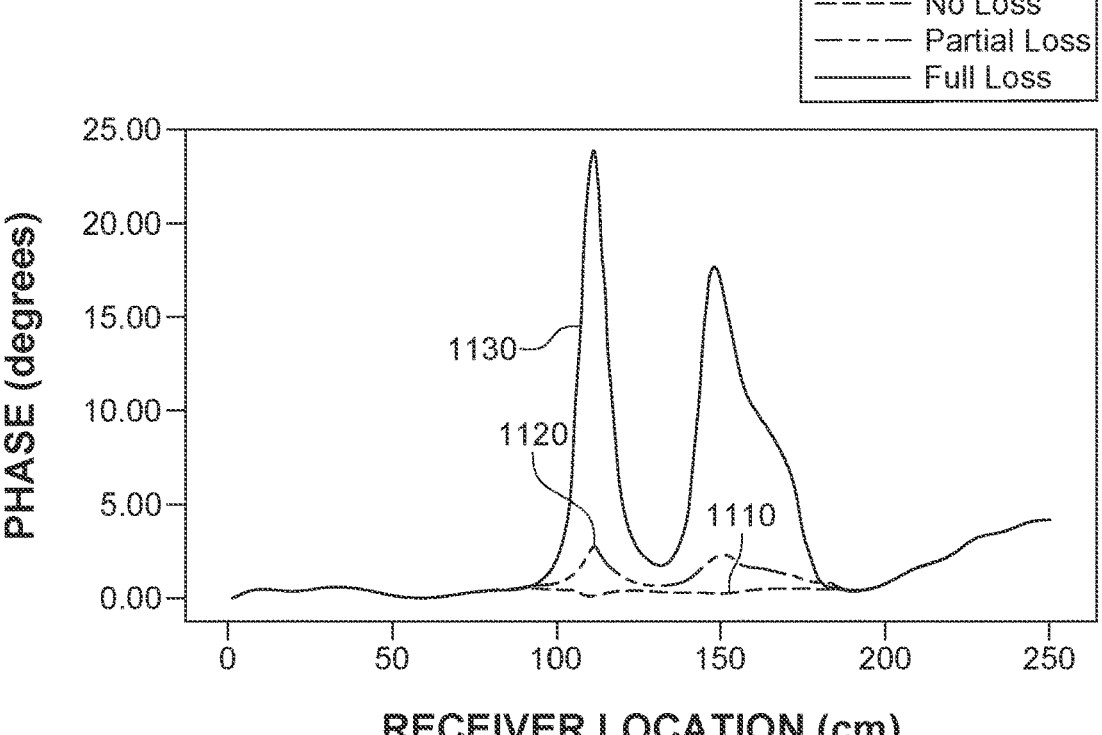

FIGS. 11A to 11F show the results of single pipe tests with defects 1 and 2 from FIG. 8. In these tests, the radial X-axis of the magnetometer is positioned directly under the defect during the scan. The pipe is also scanned before introducing the defect, so that a bassline profile is established. A cyclic pattern 1110 appears in the collected raw data. This pattern is related to the magnetization of the pipe and most likely is a consequence of the manufacturing or welding process (the pipes are seamed). However, the defect signature (curve 1120 or 1130) is still clear even with this background noise. The Y component shown in FIGS. 11C and 11D is mainly measuring the cyclic background noise 1110 as it is oriented at 90° with reference to the defect, although in the full loss case 1130 a small anomaly can be noticed. On the other hand, a strong anomaly is detected by the radial X component (FIGS. 11A and 11B) at 0° with reference to the defect. As expected, the full loss 1130 results in a more profound anomaly. The axial component Z (FIGS. 11E and 11F) shows the typical two-peak response. The relative change in both the amplitude and the phase of the radial X component in FIGS. 11A and 11B is much higher than the change in the axial component in FIGS. 11E and 11F. The observations from this experiment agree with simulation.

These results indicate that a corrosion event in one pipe has its own (unique) signature when analyzing only the radial amplitude response, or only the radial phase, or both the radial amplitude and the radial phase (in either X or Y or both). This means, that by employing machine learning and training the machine learning based on man-made defects in various pipes, it is possible to feed the trained machine learning device to identify the angular (azimuth) location of the defect in the pipe, and the extent of the defect.

Figure 12A:
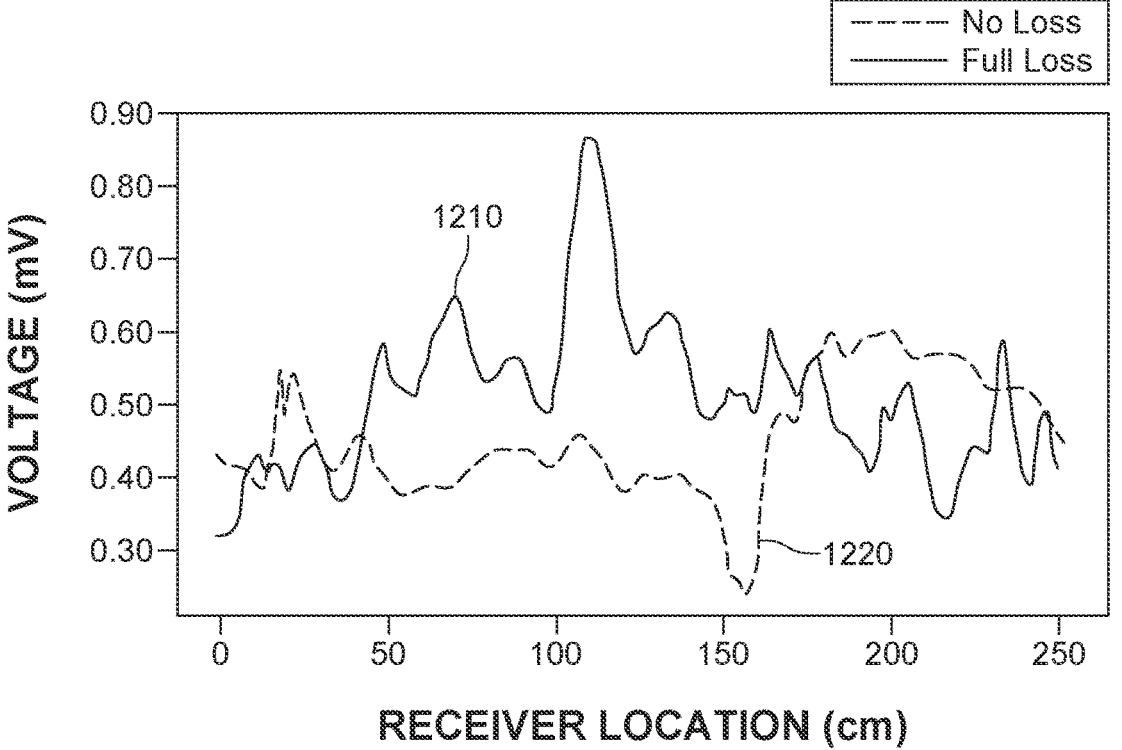
FIGS. 12A to 12F illustrate the double pipe partial and full loss magnitude and phase responses for the radial and axial directions.
Figure 12B:
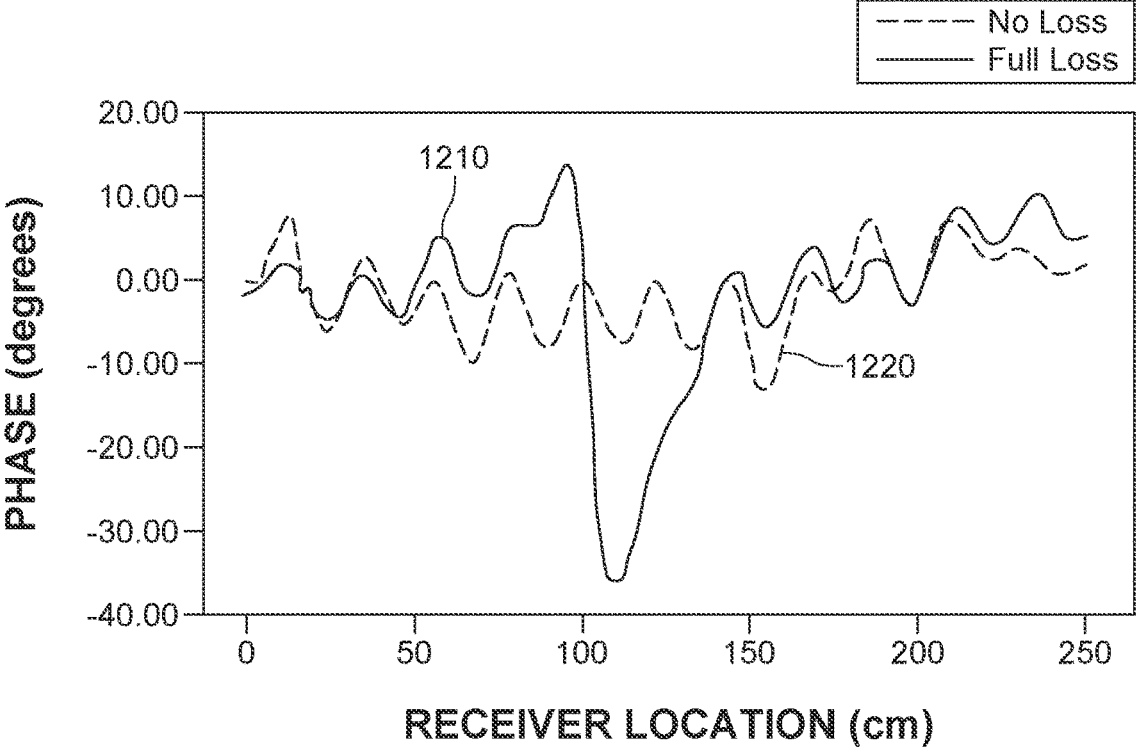
Figure 12C:
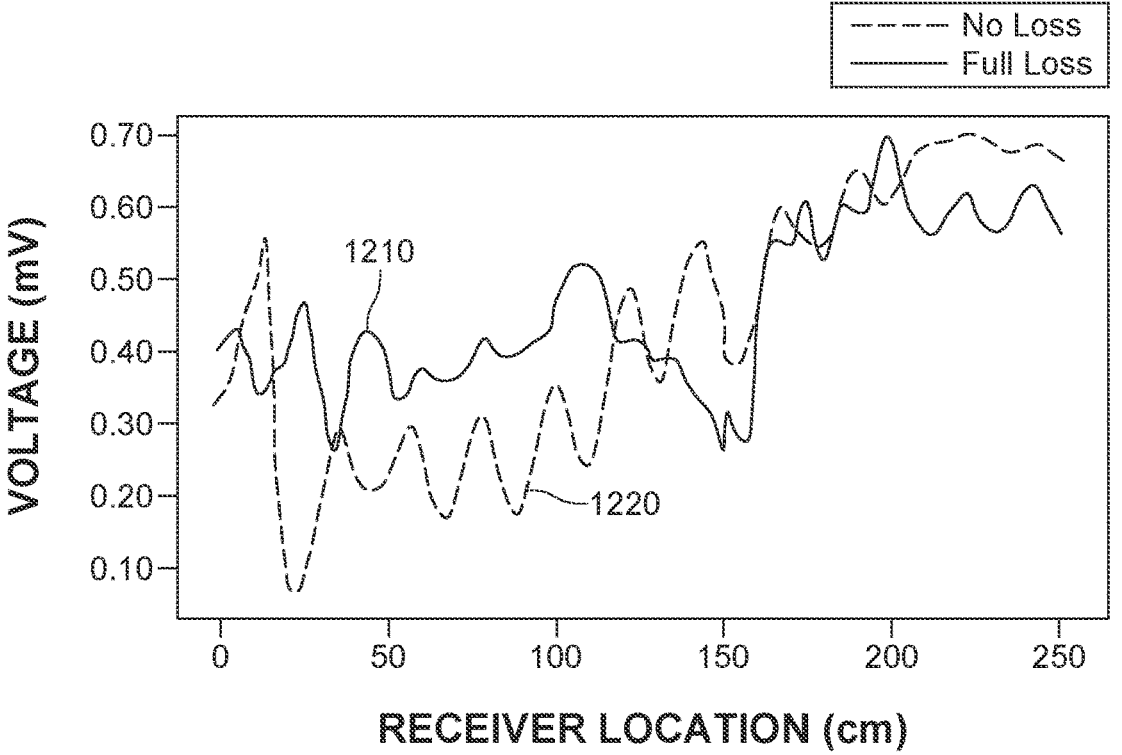
Figure 12D:
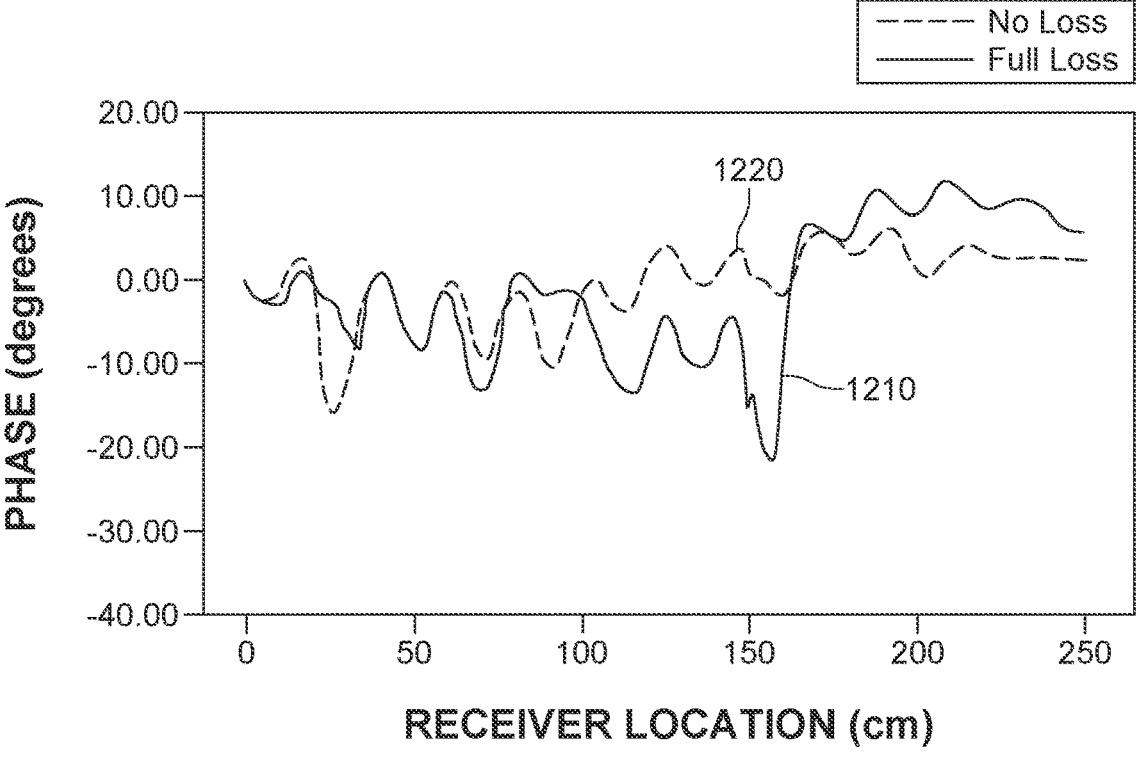
Figure 12E:
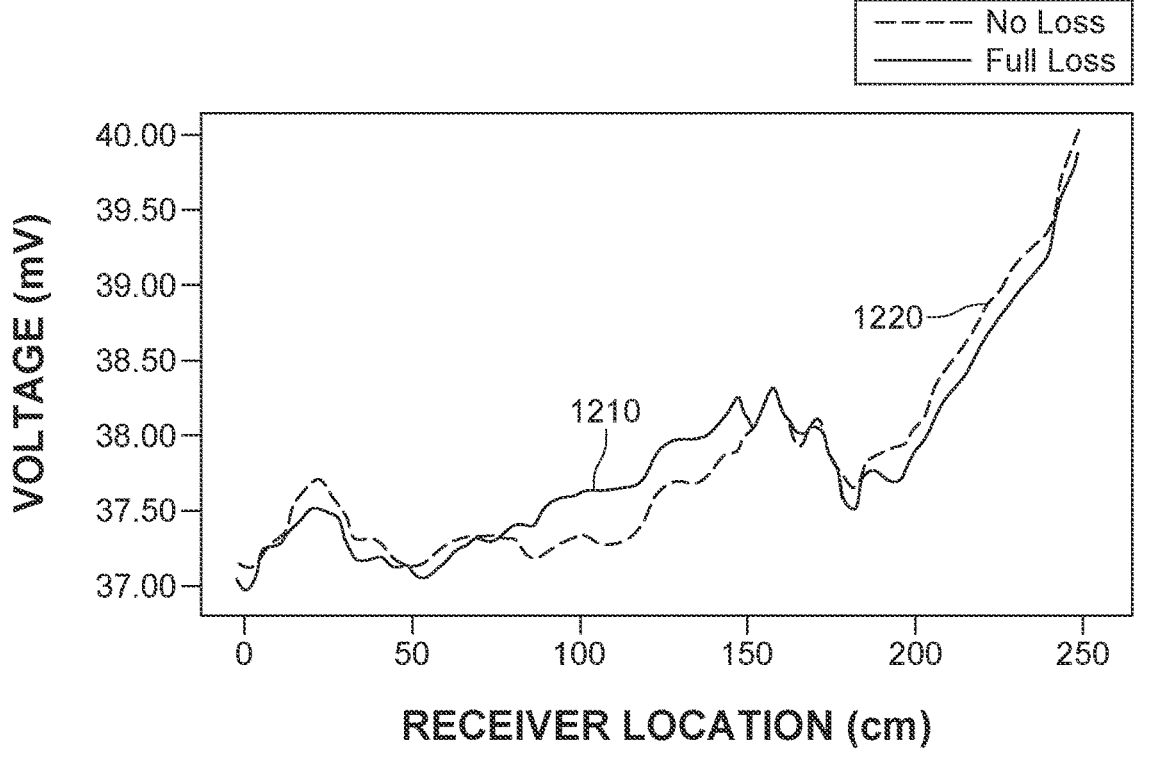
Figure 12F:
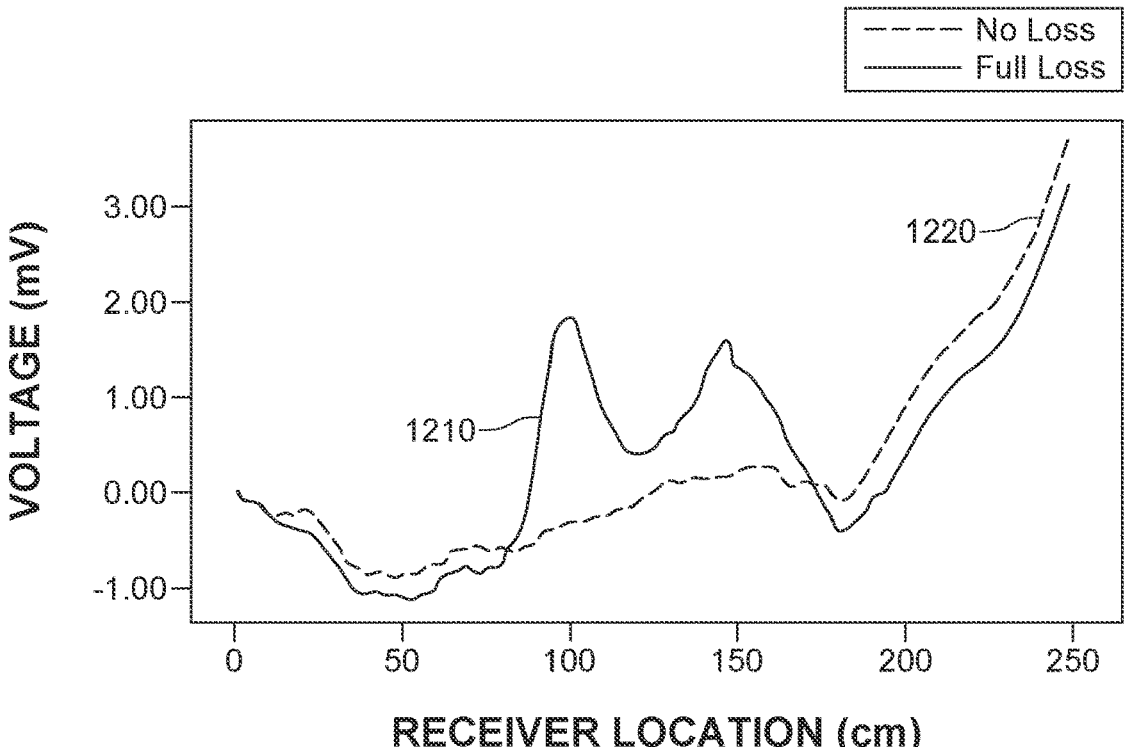

The inventors next performed similar tests on a double pipe assembly. The spacing between the transmitter and the receiver magnetometer, along the axial direction of the pipe assembly, is 40 cm. FIGS. 12A to 12D show the in-phase amplitude and phase measurement results for the radial directions (X and Y axes) and FIGS. 12E and 12F show the magnitude and phase responses for the axial direction (Z axis) for the double pipe setup by using defect no. 3 from the table of FIG. 8. These figures show unique signatures for the full loss case (curve 1210) and the no loss case (curve 1220) when the defect is present. Thus, using the trained machine learning, it is possible to determine the azimuth location of the defect, and also its extent. Identifying such a minor defect that only accounts for 3% of the cross-sectional volume in the two-pipe scenario is more complicated than in the single-pipe case, but due to the sensitivity of the magnetometer 300, a considerable shift in both the axial and radial components is noticed. This experimentally demonstrates the capability of azimuthally detecting a small local loss on the casings (second pipe), which has always been a challenge even for state of art sophisticated EM tools as discussed above.

Figure 13A:
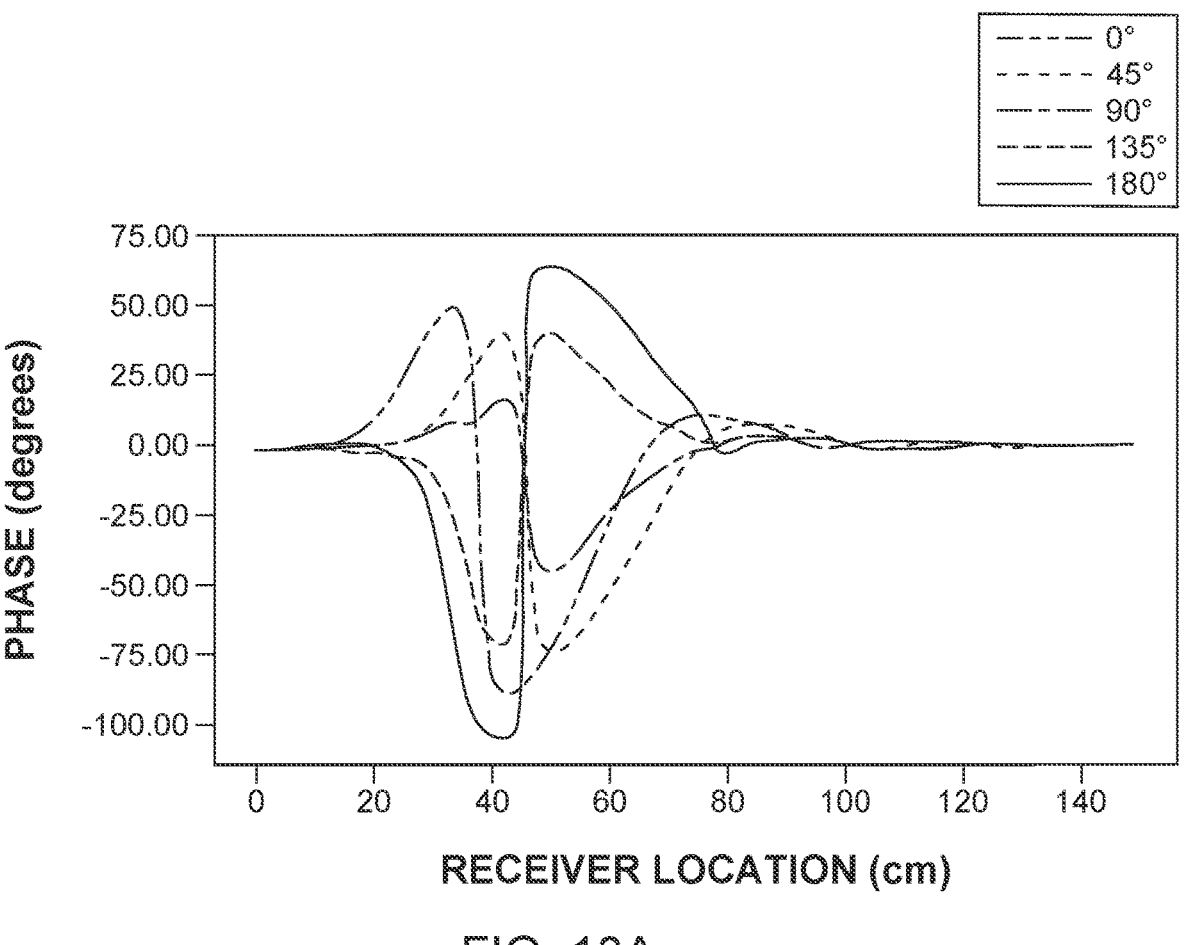
FIGS. 13A and 13B illustrate the magnetic field phase response when the defect is rotated in single and double pipe configurations.
Figure 13B:
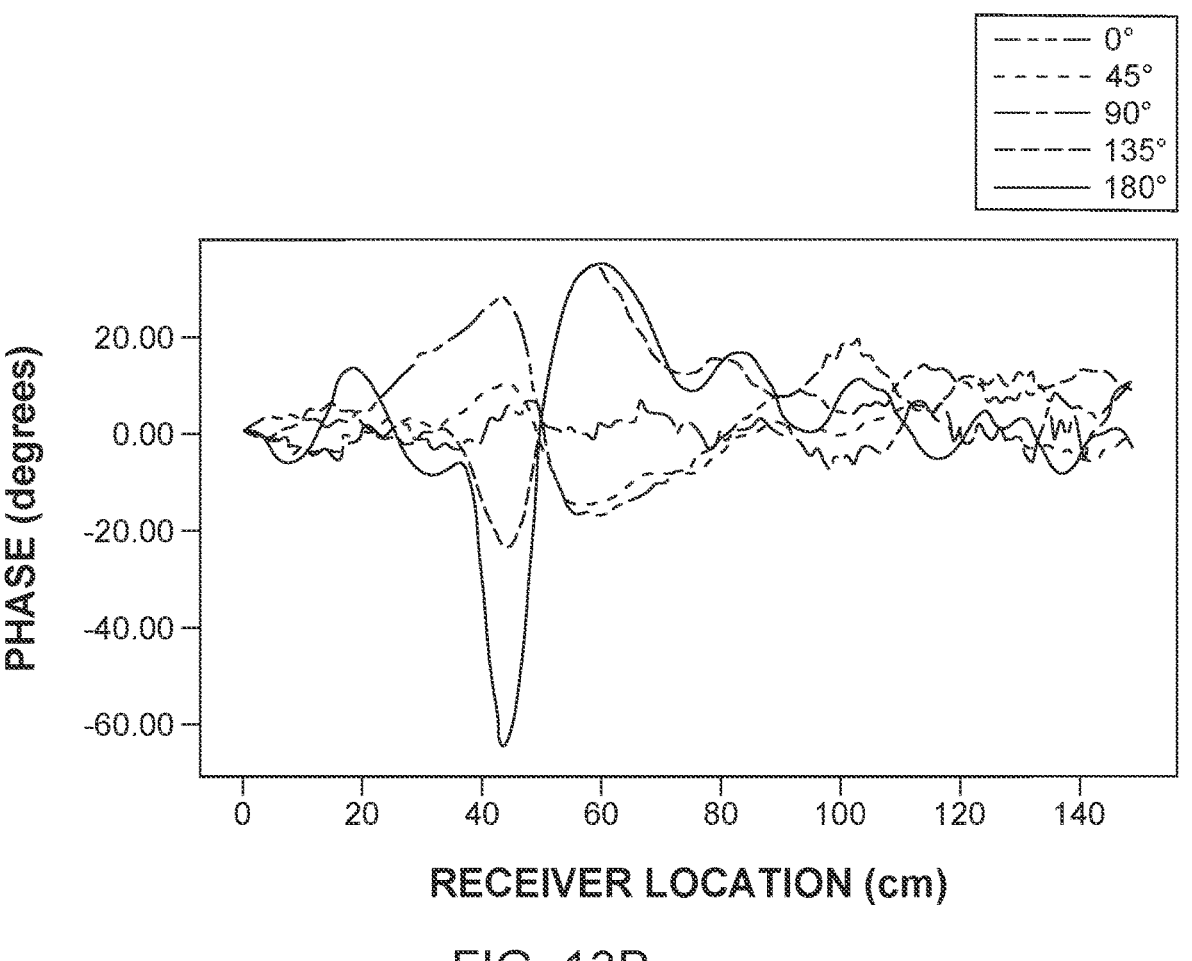

To further show the azimuthal sensitivity of system 500, the pipe is rotated at different angles and the magnitude and the phase of the magnetic field's X, Y and Z components are collected. This experiment is performed on both single and double pipe setups. The measured raw profiles of magnetic field B are illustrated in FIGS. 13A and 13B, where FIG. 13A shows the measurements for a single pipe setup and FIG. 13B shows the measurements for a double pipe setup. Both figures show the phase response on the X-axis. These figures show the directional dependency of the magnetic field signatures on the defect orientation and their symmetry, in all tested cases, in both single and double pipe setups.

All the results shown in FIGS. 9A to 13B attest to the unique mapping between (1) a given defect in one or more pipes, and (2) the azimuthal location of the defect, its location in the one or more pipes, and the extent of the defect. Based on these observations, and the novel system 500 introduced in FIG. 5, the inventors have added a machine learning capability to the system 500, for identifying the defects based on the measured magnetic field. Note that the machine learning capability, which is discussed next in more detail, can be run either in the controller 506 shown in FIG. 5 as being located inside the holder 502, or at the surface, in the controller 530.

Figure 14:
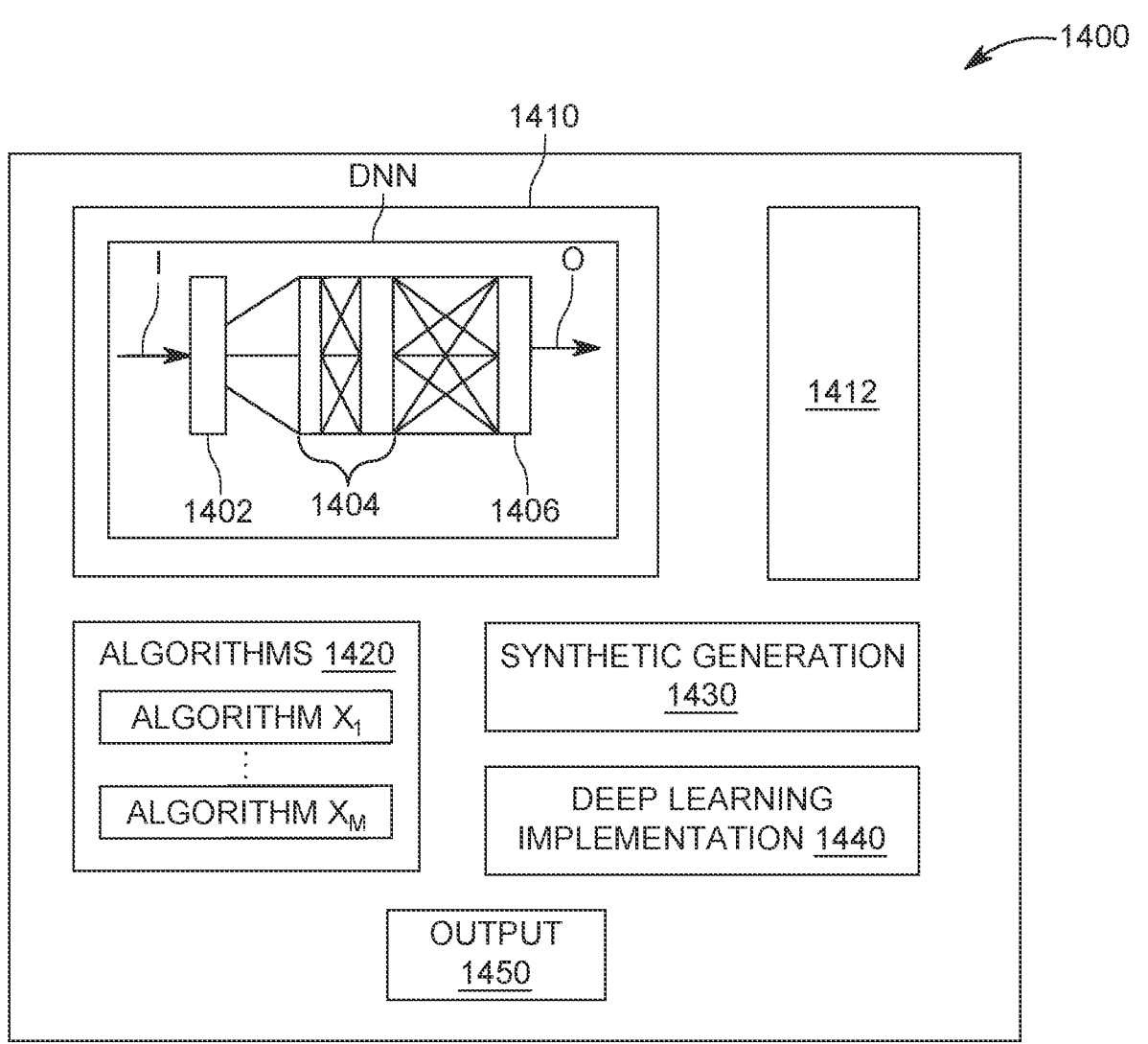
FIG. 14 schematically illustrates a machine learning configuration that is used for determining the azimuth location and extent of the defect in the pipes.

A deep learning framework 1400, as illustrated in FIG. 14, may include a deep neural network (DNN). For example, such a framework can receive information I through an input layer 1402, analyze the information via hidden layers 1404, and output information O via an output layer 1406. The information I received at the input layer 1402 can be images, such as facial images that are composed of pixels, which may be in a color space (e.g., RGB, grayscale, etc.). The framework 1400 may learn (e.g., be trained) in one or more manners. Learning may be deep learning. As an example, learning can include unsupervised learning, reinforcement learning, supervised learning, semi-supervised learning, etc. Deep learning can be applied to tasks where a basic unit, a single pixel, a single frequency, a part of a signal, or a single word/character, may have a relatively limited meaning by itself, but where a combination of such units has a relatively larger amount of meaning, i.e., an image, a signal associated with a defect in a pipe, etc. As an example, a combination of units may be assessed as to individual values of the units, which may be collectively useful. As an example, a method can include deep learning of useful combinations of values without human intervention. For example, consider deep earning's ability to learn features from data of a dataset of handwritten digits. In such an example, when presented with tens of thousands of handwritten digits, a deep neural network can learn that it is useful to look for loops and lines when trying to classify the digits. Similarly, when looking for magnetic field magnitudes and/or phases associated with a defect in a single pipe or plural pipes, the deep neural network can learn to looks for spikes when trying to determine the azimuth location of the defect, and its extent.

Deep learning can be implemented using one or more techniques or technologies, such as, for example, an optimizer, stochastic gradient descent, unsupervised data pretraining of models to automate feature extraction, transfer functions, large data set(s) size, multiple processors (e.g., GPUs and/or CPUs) to accommodate considerable computational costs incurred by deep neural network models, etc. In one application, each successive layer in a neural network can utilize features from a previous layer to learn more complex features. For example, with reference to the system 500, at the lowest level, the neural network identifies and fixates on anomalies at a local level in the measured signal. The next layer can then further use those patterns of local contrast to fixate on data that are reminiscent of the anomalies when compared with a background noise signal, e.g., signal 1110 in FIGS. 11A to 11F. Another subsequent layer of the DNN can (e.g., a top layer) then apply parameters tuned to these anomalies to characterize defects in the pipes. In such an example, a deep neural network is capable of extracting features of increasing complexity in each of its successive layers. Furthermore, a neural network may adapt a parallel structure instead of a sequential one, whereby layers of various hyperparameters identify and fixate on anomalies and produce a plurality of results for their own subsequent layers. Such parallel layers are eventually concatenated, and the corresponding outputs are used by a final layer to characterize pipe structure and defect properties.

Thus, framework 1400 can perform learning of data representations and features. Such an application of deep neural networks, especially recurrent models, may include models that can learn useful hierarchical representations of images, audio and written language. For example, consider these learned feature hierarchies in these domains can be construed as text: Character-word-word group-clause-sentence.

Framework 1400 can include one or more processors 1410 and memories 1412, which can be one or more memory devices where at least one is accessible by at least one of the one or more processors 1410. As an example, one or more features of framework 1400 may be provided in the form of executable instructions storable in memory 1412. For example, such instructions can include processor-executable instructions that can cause framework 1400 to perform one or more actions (e.g., one or more actions of one or more of methods, etc.). As shown in FIG. 14, the framework 1400 includes a plurality of selectable algorithms 1420 (e.g., X1, to XM), a synthetic generation block 1430, a deep learning implementation block 1440 (e.g., for training and/or implementing a trained deep learning network (s)), and an output block 1450 to output information to a display, an interpretation framework, a controller, etc.

As to the synthetic generation block 1430, it may operate as to generation and/or augmentation of synthetic data (magnetic field magnitude, magnetic field phase, in-phase and quadrature phase magnitude and phases, etc.); generation and/or augmentation of synthetic data based on previous corrosion pipe measurements; and augmentation of synthetic based on previous pipe tests. This block may also store any corrosion pipe data generated by any existing device or procedure. The framework 1400 may be implemented in the global controller 530 shown in FIG. 5 or in the local controller 506, shown in the same figure.

A method for detecting an azimuth location of a defect 542 in a pipe 540 is now discussed with regard to FIG. 15. The method includes a step 1500 of placing a remote field eddy current, RFEC, system inside the pipe, a step 1502 of translating the system along the pipe while generating a first magnetic field $B_0$ with a magnetic field generator located within a holder, a step 1504 of recording, with a fluxgate magnetometer located within the holder, at a given distance away from the transmitter, a second magnetic field B, which is due to the first magnetic field $B_0$, and the second magnetic field B is influenced by the defect in the pipe, and calculating, with a controller located within the holder, an azimuth of the defect in the pipe and an extent of the defect based on the second magnetic field B.

In one application, the method may further include a step of controlling the magnetic field generator to generate the first magnetic field $B_0$ to have a magnitude and a phase. In this or another application, the method may also include one or more of the following steps: applying a rotation matrix having a phase $\Phi$, to align a sensing axis of the magnetic field generator to the measured magnetic field B, so that a rotated magnetic field $B_r$ is obtained, generating in-phase and quadrature-phase lock-in references; multiplying each component of the rotated magnetic field $B_r$ with the lock-in and quadrature-phase lock-in references to generate lock-in and quadrature magnetic fields, applying a low pass filtering to the lock-in and quadrature magnetic fields to generate filtered lock-in and quadrature magnetic fields, calculating radial and axial phases and magnitudes corresponding to the filtered lock-in and quadrature magnetic fields, identifying with a machine learning algorithm the azimuth and extent of the defect based on the radial phases or magnitudes, identifying the azimuth and extent of the defect based on the radial phases and magnitudes, identifying whether the defect is present in the pipe or another pipe concentric to the pipe, changing a frequency of the first magnetic field $B_0$ for probing another pipe concentric to the pipe, and/or translating the system through the pipe by deploying one or more wings attached to the holder.

Note that the rotation matrix discussed above describes the mathematical relation between the defect location with reference to the radial sensing elements of the magnetometer, so the sensitivity to azimuthal location/direction is demonstrated and defined mathematically. In one application, the rotation matrix is not applied to the measured data. Azimuthal location of the defect is determined by interpreting directional-dependent radial phase and magnitude measurements.

The systems discussed in the above embodiments were based on equations and a testing setup that demonstrates the usage of one three-axis fluxgate magnetometer. For this configuration, the system has 2 orthogonal radial sensing elements with 90-degree separation. The sensitivity of the proposed method in determining the azimuthal/directional location of the defect can be improved by increasing the number of radial sensing elements. Thus, in one embodiment, it is possible to use multiple 3-axis sensors fitted at different orientations to have more radial elements evenly spaced. For example, in one application, two 3-axis sensors are used, which results in four radial elements with 45-degree radial spacing. One skilled in the art would understand that as more sensors are added to the system, a better resolution can be achieved.

In another embodiment, it is possible to have multiple fluxgate sensors at different spacings, thus the spacing can be tailored to a certain pipe's diameter and certain operating frequency. For example, in a three nested pipe system, it is possible to have a tool with three transmitters (Tx) and three fluxgate receivers (Rx), each pair of Tx and Rx being optimized in terms of the spacing and operating frequency. The location of the fluxgate sensors can be before or after the transmitter coil.

In this or another embodiment, it is possible to have more than one transmitter coil to be used in different configurations. For example, the transmitter coils can be oriented axially (as demonstrated) or radially to enhance the radial field. Another possible configuration is to have 3 orthogonal transmitter coils, aligned with the sensing elements of the 3-axis magnetometer. The three orthogonal transmitters can also be excited by phase shifted driving signal to generate a rotating magnetic field, which could enhance the response of the proposed RFEC system to certain defects.

It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

The disclosed embodiments provide a corrosion detection system and associated machine learning for determining azimuth distribution and extend of corrosion in one or more concentric pipes. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] Dutta, S., and Olaiya, J. (2020). *Analysis and Interpretation of Multi-Barrier Transient Electromagnetic Measurements*. In SPWLA 61st Annual Logging Symposium (p. D013S003R001). doi.org/10.30632/SPWLA-5008.

[2] Haugland, S. M. (1996). *Fundamental Analysis of the Remote-Field Eddy-Current Effect*. IEEE Transactions on Magnetics, 32(4).

[3] Ooi, G. A., Özakin, M. B., Mostafa, T. M., Bagci, H., Ahmed, S., and Larbi Zeghlache, M. (2021). *EM-Based 2D Corrosion Azimuthal Imaging using Physics Informed Machine Learning PIML*. In SPE Offshore Europe Conference & Exhibition (p. D032S017R002). doi.org/10.2118/205404-MS.

[4] Brill, T. M., Demichel, C., Nichols, E. A., and Zapata Bermudez, F. (2011). *Electromagnetic Casing Inspection Tool for Corrosion Evaluation*. In International Petroleum Technology Conference (p. IPTC-14865-MS). doi.org/10.2523/IPTC-14865-MS.

[5] Fouda, A., Dai, J., and Hu, Y. (2020). *Multi-Tubular Electromagnetic Corrosion Inspection Tool—Performance Demonstration using Yard Testing*. In Abu Dhabi International Petroleum Exhibition & Conference (p. D021S035R004). doi.org/10.2118/202718-MS.

[6] Larbi Zeghlache, M., Bazaid, A., Hill, F., and Guergueb, N. (2021). *Comprehensive Casing Corrosion Inspection Using Multi-Frequency Array EM Technology*. In SPE International Oilfield Corrosion Conference and Exhibition. doi.org/10.2118/205050-MS.

[7] Martin, L. E., Fouda, A. E., Amineh, R. K., Capoglu, I., Donderici, B., Roy, S. S., and Hill, F. (2017). *New High-Definition Frequency Tool for Tubing and Multiple Casing Corrosion Detection*. In Abu Dhabi International Petroleum Exhibition & Conference (p. D041S116R003). doi.org/10.2118/188932-MS.

[8] Zhang, J., Ho, T., Wallace, F., O'Brien-Herr, I., Tran, L., and Mahbod, P. (2018). *New Ruggedized Electromagnetic Tool Achieving Quantitative Azimuthal Casing Inspection*. In SPWLA 59th Annual Logging Symposium (p. D053S012R005).

[9] Dutta, S. M., Iqbal, P., Olaiya, J., & Danilenko, V. (2021). *Quantitative Evaluation of Multi-Annular Downhole Corrosion Using Time-Domain Electromagnetic Measurements*. In Abu Dhabi International Petroleum Exhibition & Conference (p. D021S061R001). doi.org/10.2118/207260-MS.

[10] Ramos, H. G., and Ribeiro, A. L. (2014). *Present and future impact of magnetic sensors in NDE. Procedia Engineering*, 86, 406-419. doi.org/10.1016/J.PROENG.2014.11.054

[11] Rifai, D., Abdalla, A. N., Ali, K., and Razali, R. (2016). *Giant magnetoresistance sensors: A review on structures and non-destructive eddy current testing applications*. Sensors (Switzerland), 163. doi.org/10.3390/S16030298

[12] Park, J., Park, J., Song, S., Mb, K., Kwon, S., and Kim, H. (2017). *Enhanced Detection of Defects Using GMR Sensor Based Remote Field Eddy Current Technique*. Journal of Magnetics, 22, 531-538. doi.org/10.4283/JMAG.2017.22.4.531.

[13] Pasadas, D. J., Rocha, T. J., Ramos, H. G., and Ribeiro, A. L. (2013). *Remote field eddy current inspection of mlic tubes using GMR sensors*. 2013 IEEE International Instrumentation and Measurement Technology Conference (I2MTC), 296-299. doi.org/10.1109/I2MTC.2013.6555427

[14] Pasadas, D. J. L., Ribeiro, A. L., Ramos, H. G., and Rocha, T. J. (2015). *Defect detection in stainless steel tubes with AMR and GMR sensors using remote field eddy current inspection*. ACTA IMEKO, 4(2), 62-67. doi.org/10.21014/ACTA_IMEKO.V4l2.234

[15] Gooneratne, C. P., Li, B., and Moellendick, T. E. (2017). *Downhole Applications of Magnetic Sensors*. doi.org/10.3390/s17102384.

[16] Ripka, Pavel. (2001). *Magnetic sensors and magnetometers*. 494.

What is claimed is:

1. A remote field eddy current, RFEC, system for detecting an azimuth location of a defect in a pipe, the system comprising:

a holder extending along a longitudinal axis X and shaped to flow through the pipe;

a magnetic field generator located within the holder and configured to generate a first magnetic field $B_0$;

a 3-axis fluxgate magnetometer located within the holder, at a given distance away from the magnetic field generator, along the longitudinal axis X, wherein the fluxgate magnetometer has two parallel cores, a first coil that wraps around each of the two cores, in opposite directions, and a second coil that wraps around the two cores in a same direction, and the fluxgate magnetometer is configured to measure a second magnetic field B, which is a result of the first magnetic field $B_0$ interacting with the defect in the pipe; and a controller located within the holder and configured to receive a value of the second magnetic field B and to determine an azimuth of the defect in the pipe by interpreting radial components of the measured second magnetic field B, and an extent of the defect based on the second magnetic field B.

2. The system of claim 1, wherein the controller is configured to control the magnetic field generator to generate the first magnetic field $B_0$ to have a magnitude and a phase.

3. The system of claim 2, further comprising:

a lock-in amplifier configured to generate in-phase and quadrature-phase lock-in references, wherein the controller is configured to multiply each component of a rotated magnetic field $B_r$ with the lock-in and quadrature-phase lock-in references to generate lock-in and quadrature magnetic fields.

4. The system of claim 3, wherein the controller is configured to apply a low pass filtering to the lock-in and quadrature magnetic fields to generate filtered lock-in and quadrature magnetic fields.

5. The system of claim 4, wherein the controller is configured to calculate radial and axial phases and magnitudes corresponding to the filtered lock-in and quadrature magnetic fields.

6. The system of claim 5, further comprising:

a machine learning application, stored in the controller, that identifies the azimuth and extent of the defect based on the radial and axial phases or radial and axial magnitude, when executed by the controller.

7. The system of claim 6, wherein the machine learning application is configured to identify the azimuth and extent of the defect based on the radial phases and radial magnitudes.

8. The system of claim 6, wherein the machine learning application is configured to identify whether the defect is present in the pipe or another pipe concentric to the pipe.

9. The system of claim 1, further comprising one or more wings attached to the holder and configured to extend away from the holder when inside the pipe.

10. The system of claim 1, wherein the controller is configured to determine the azimuth of the defect by interpreting directional-dependent radial phase and magnitude measurements.

11. A method for detecting an azimuth location of a defect in a pipe, the method comprising:

placing a remote field eddy current, RFEC, system inside the pipe;

translating the system along the pipe while generating a first magnetic field $B_0$ with a magnetic field generator located within a holder;

recording, with a 3-axis fluxgate magnetometer located within the holder, at a given distance away from the magnetic field generator, a second magnetic field B, which is a result of an interaction of the first magnetic field $B_0$ with the defect in the pipe, wherein the 3-axis fluxgate magnetometer has two parallel cores, a first coil that wraps around each of the two cores, in opposite directions, and a second coil that wraps around the two cores in a same direction; and calculating, with a controller located within the holder, an azimuth of the defect in the pipe and an extent of the defect based on a value of measured radial components of the second magnetic field B.

12. The method of claim 11, further comprising:

controlling the magnetic field generator to generate the first magnetic field $B_0$ to have a magnitude and a phase.

13. The method of claim 12, further comprising:

generating in-phase and quadrature-phase lock-in references; and multiplying each component of a rotated magnetic field $B_r$ with the lock-in and quadrature-phase lock-in references to generate lock-in and quadrature magnetic fields.

14. The method of claim 13, further comprising:

applying a low pass filtering to the lock-in and quadrature magnetic fields to generate filtered lock-in and quadrature magnetic fields.

15. The method of claim 14, further comprising:

calculating radial and axial phases and magnitudes corresponding to the filtered lock-in and quadrature magnetic fields.

16. The method of claim 15, further comprising:

identifying with a machine learning algorithm the azimuth and extent of the defect based on the radial phases, or radial magnitudes, or axial phases and magnitudes.

17. The method of claim 16, further comprising:

identifying whether the defect is present in the pipe or another pipe concentric to the pipe.

18. The method of claim 15, further comprising:

identifying the azimuth and extent of the defect based on the radial phases and radial magnitudes.

19. The method of claim 15, further comprising:

determining the azimuth of the defect by interpreting directional-dependent radial phase and magnitude measurements.

20. The method of claim 11, further comprising:

changing a frequency of the first magnetic field $B_0$ for probing another pipe concentric to the pipe.

*     *     *     *     *